United States Patent [19]

Molivadas

[11] 4,340,030

[45] Jul. 20, 1982

[54] SOLAR HEATING SYSTEM

[76] Inventor: Stephen Molivadas, 2800 Upton St., NW., Washington, D.C. 20008

[21] Appl. No.: 902,950

[22] Filed: May 5, 1978

Related U.S. Application Data

[63] Continuation-in-part of Ser. No. 457,271, Apr. 2, 1974, Pat. No. 4,211,207.

[51] Int. Cl.³ .............................................. F24J 3/02
[52] U.S. Cl. .................................... 126/421; 126/419; 126/433; 126/435; 165/104.22; 165/104.25
[58] Field of Search .................... 165/104 S; 126/433, 126/435, 437, 432, 419, 421; 60/641; 62/2

[56]  References Cited

U.S. PATENT DOCUMENTS

| | | | |
|---|---|---|---|
| 1,119,063 | 12/1914 | Burnap | 126/435 |
| 2,396,338 | 3/1946 | Newton | 62/2 X |
| 2,933,885 | 4/1960 | Benedek et al. | 165/104 S X |
| 3,390,672 | 7/1968 | Snelling | 126/433 |
| 4,052,976 | 10/1977 | Hinterberger | 126/433 |
| 4,102,325 | 7/1978 | Cummings | 126/419 X |
| 4,120,289 | 10/1978 | Bottum | 126/421 |
| 4,220,138 | 9/1980 | Bottum | 126/433 |

Primary Examiner—Albert W. Davis
Attorney, Agent, or Firm—Fleit & Jacobson

[57] ABSTRACT

Various systems are disclosed for absorbing radiant heat, especially solar heat, by evaporating a refrigerant, and for releasing the heat thus absorbed to a medium to be heated, by condensing the evaporated portion of the refrigerant. The refrigerant fluid loop includes (1) an evaporator, or solar collector, including passageways where at least a portion of the refrigerant is vaporized, (2) a separator which may be a part of or a separate component from the evaporator, that divides the vapor portion and the liquid portion of the refrigerant exiting the evaporator passageways, (3) a condenser for condensing the vapor portion of the refrigerant and transferring the latent heat released to a medium to be heated, and (4) a condensate pump to return the liquid refrigerant from the separator and condenser to the evaporator. Systems are also disclosed for returning the liquid refrigerant to the evaporator by gravity thus eliminating the need for a condensate pump. Controls and component arrangements are shown for maintaining the temperature of evaporation of the refrigerant automatically insofar as practical just above that of the medium to be heated, independently of changes in the temperature of the medium, the temperatures of the system's surroundings, and the intensity of radiation intercepted by the system. Also disclosed are novel solar collector designs applicable to the invented systems.

112 Claims, 23 Drawing Figures

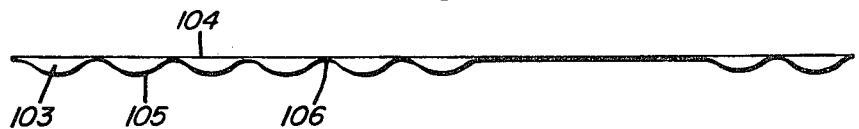
Fig. 2C
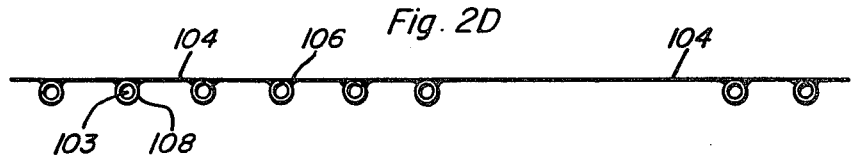
Fig. 2D
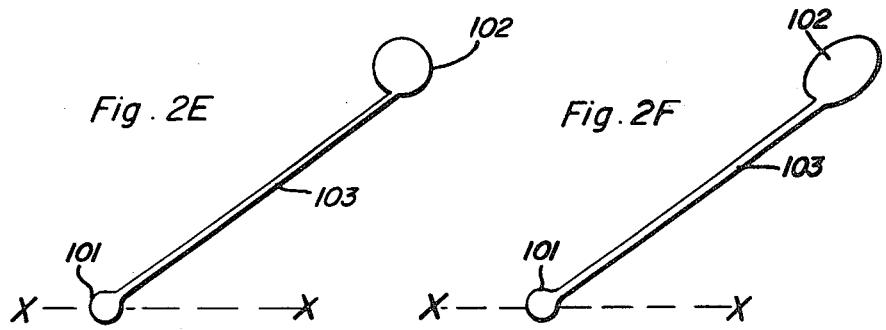
Fig. 2E
Fig. 2F
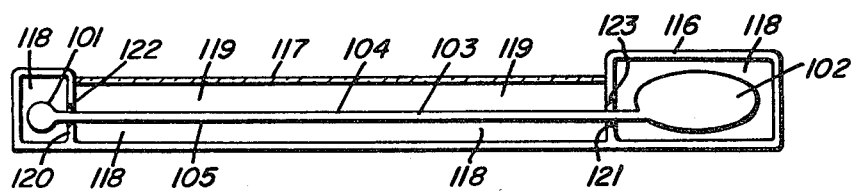
Fig. 3A
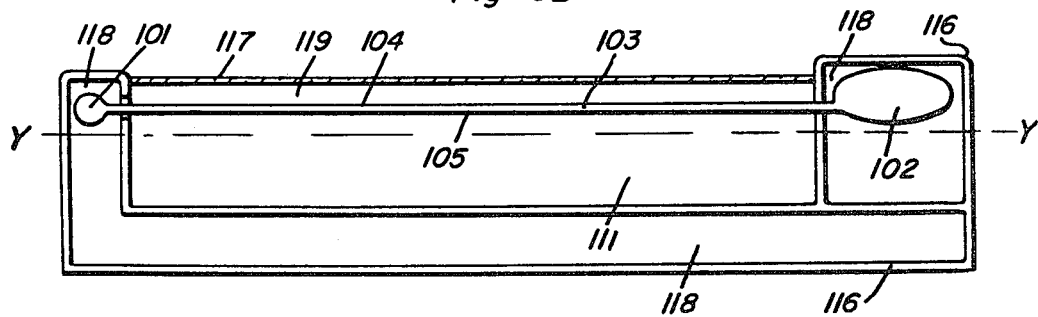
Fig. 3B

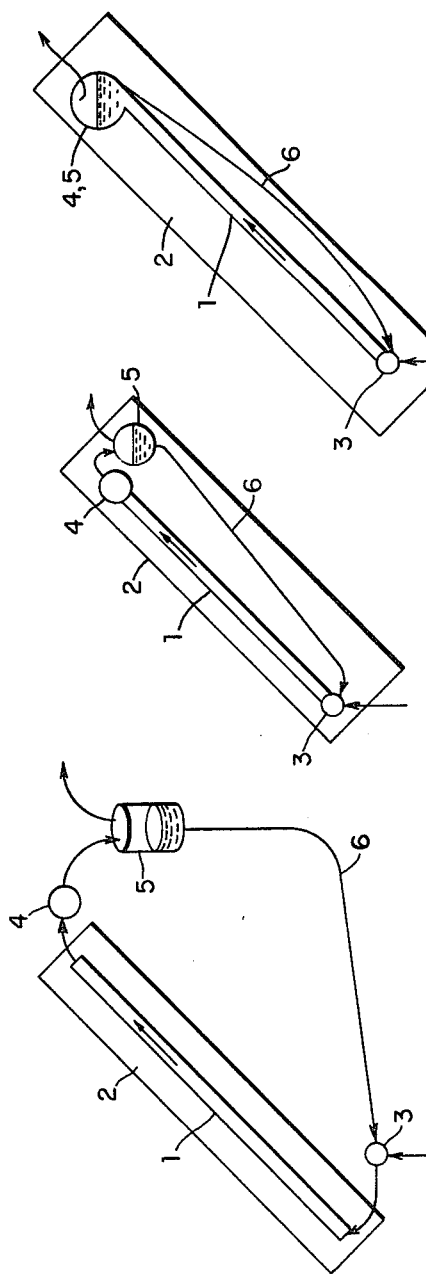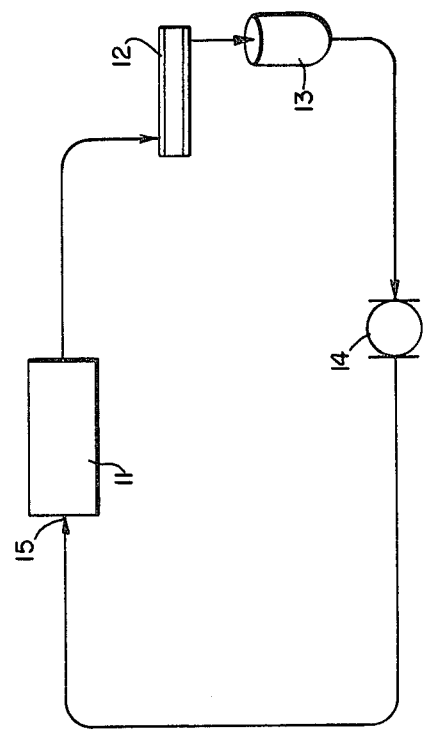
Fig.4
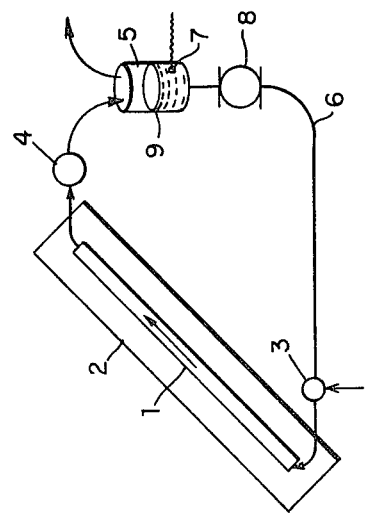
Fig.12
Fig.11A
Fig.11B
Fig.11C

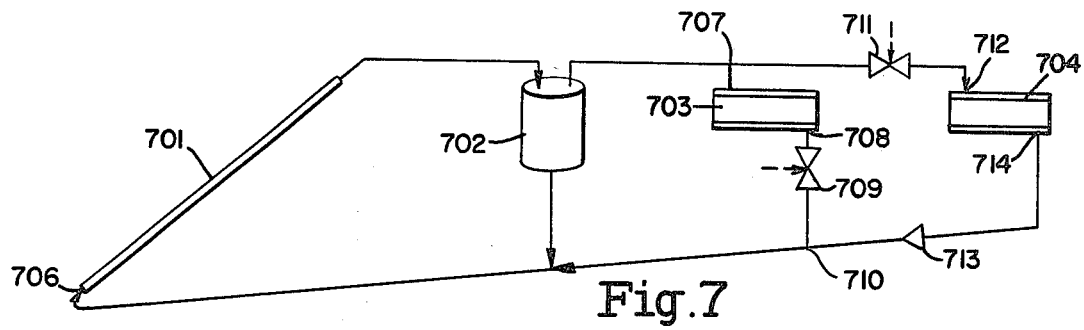
Fig. 7
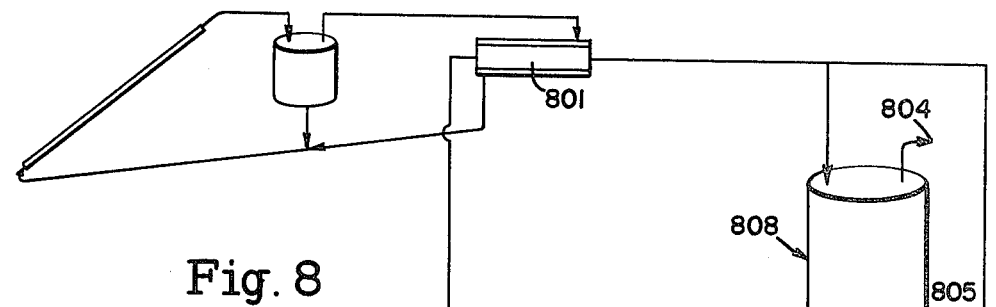
Fig. 8
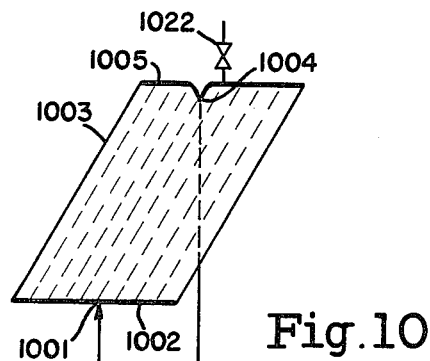
Fig. 10
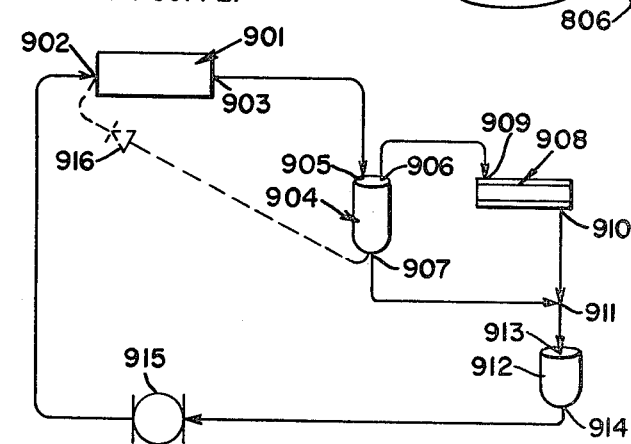
Fig. 9
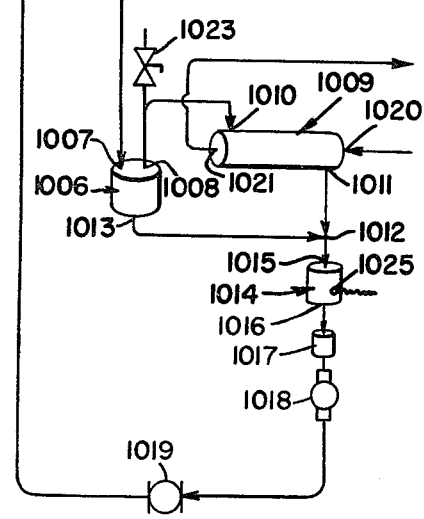
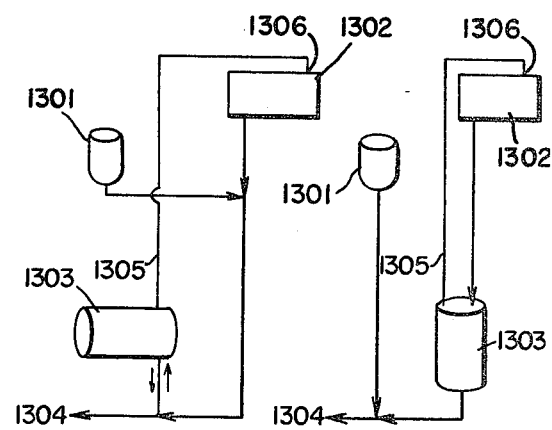
Fig. 13A  Fig. 13B

SOLAR HEATING SYSTEM

RELATED APPLICATION

This application is a continuation-in-part of my co-pending application Ser. No. 457,271, filed Apr. 2, 1974, entitled "HEATING AND COOLING SYSTEMS", now U.S. Pat. No. 4,211,207.

In my co-pending application Ser. No. 457,271 the classes of Rankine-type heat-transfer systems with no condensate pump were only mentioned cursorily on page 29 as special cases of embodiments employing a condensate pump in which the differences in elevation of the system components are small enough and the fluid passages are large enough for the heat-transfer cycle to be self-sustaining without a condensate pump. Furthermore, because my co-pending application Ser. No. 457,271 covers not only embodiments employing Rankine-type heat-transfer cycles, but also heat-pump cycles and Rankine power cycles, I thought it impractical—and anyhow believed it unnecessary—to describe and claim in greater detail the disclosed Rankine-type heat-transfer system embodiments with a condensate pump. However, it became apparent, in the light of references cited by the Examiner and others during the prosecution of application Ser. No. 457,271, that (1) to disclose Rankine-type heat-transfer systems with no condensate pump as special cases of Rankine-type heat-transfer systems employing condensate pumps was not sufficient to show how the former systems differ patentably over the prior art, and that (2) to rely solely on the specification and allowed claims in application Ser. No. 457,271 to prove that all useful embodiments of two-phase, liquid-vapor heat-transfer systems are subsumed in the embodiments disclosed and claimed in application Ser. No. 457,271 would be unwise.

Therefore, a first objective of the present application is to describe more specifically, and to present a comprehensive set of claims covering, embodiments of Rankine-type heat-transfer systems which employ no condensate pump; a second objective of the present application is to describe the techniques of overpressure protection and combined overpressure and overtemperature protection, and to claim embodiments of Rankine-type heat-transfer systems employing these techniques; and a third objective of the present application is to describe and claim in greater detail some of the embodiments of Rankine-type, heat-transfer systems with condensate pump which Applicant believes are obviously subsumed in the description and claims presented in patent application Ser. No. 457,271.

This application thus discloses systems for absorbing radiant heat from a source external to, and not under the control of the system, particularly from such sources as solar radiation, and releasing it to a medium to be heated by a (heat-transfer) working fluid in the case where the cycle employed by the working fluid is a Rankine-type heat-transfer cycle. More specifically, the cycle followed by the working fluid of this invention (a) absorbs heat in an absorber (collector) of radiant energy primarily by evaporation (boiling), (b) releases substantially all of the absorbed heat to the medium to be heated primarily by condensation, and (c) is returned, in its condensed form, to the absorber, either by the force of a pump or pumps or, in special cases, by the action of gravity. Thus, the part of the fluid that absorbs heat and transfers it to the medium to be heated transverses a thermodynamic cycle that resembles that of a Rankine-power cycle in which the engine has been omitted. Accordingly, substantially all of the absorbed heat is utilized in the condenser to heat the condenser medium to be heated, such as water in a hot water heater.

In my prior co-pending application, Ser. No. 457,271, the working fluid is referred to as a refrigerant and a "liquid-vapor" working fluid. For simplicity in this application, I shall use only the term "refrigerant" to have the identical meaning. Refrigerants for the instant invention comprise any working fluid that absorbs heat from a source primarily by evaporation and releases it to a medium, or media, to be heated primarily by condensation. Refrigerants particularly applicable to the present invention include halogenated compounds that include fluorine, such as the "Freon" series of refrigerants manufactured by E. I. duPont & Co., and ammonia, as well as water which is formally designated by ASHRAE in its publication "Thermo-physical Properties of Refrigerants" as Refrigerant 718.

By employing this Rankine-type heat-transfer cycle, more efficient and practical systems can be devised for specific applications in which radiant heat emanating from a source external to the system, such as solar heat, is absorbed and then released to a medium to be heated. The improvement in efficiency is obtained by absorbing and releasing latent heat instead of sensible heat, and by maintaining continuously during operation the saturation temperature of the working fluid in the absorber-evaporator just above the temperature of the medium to be heated independently of the degree of insolation and outdoor temperature even when the temperature of this medium varies with time.

DESCRIPTION OF THE PRIOR ART

Previously known systems for heating a medium by absorbing radiant heat, and in particular solar heat, primarily by evaporation, and for releasing the heat thus absorbed primarily by condensation fall into two general categories referred to as "heat pipes" and "steam heating systems", where the word "steam" is used in the generic sense and includes the vapor of any fluid.

Heat pipes depend on capillary action for returning the working fluid from the condenser to the evaporator (or absorber) and, thus, impose constraints on the maximum height of the evaporator above the condenser. Steam heating systems utilize energy sources, such as burners, etc., which are a part of the system and can be controlled by the system. Further, the temperature of evaporation in a steam system is controlled either by controlling the energy source, or by controlling the difference in temperature between the saturated vapor temperature of the working fluid in the radiant heat absorber (boiler) and the saturated vapor temperature in the condenser, or both, essentially as a function of the heating load. An example of such a system is shown in U.S. Pat. No. 2,434,086.

Additional prior patents directed to various systems employing solar or radiant heat energy sources include U.S. Pat. Nos. 1,119,063, 1,801,710, 2,396,338 and 2,693,939.

SUMMARY OF THE INVENTION

Accordingly, the primary object of the present invention is to define improved systems for absorbing radiant heat and releasing it to a medium to be heated in the case where the radiant heat emanates from a source external to the system and is not under the control of the system, for example, solar radiation. This primary object is achieved by employing a Rankine-type heat-transfer cycle for the working (heat-transfer) fluid cycle. In other words, the working fluid that absorbs heat and transfers it to the medium to be heated traverses a thermodynamic cycle that resembles that of a Rankine-power cycle in which the engine has been omitted.

A further primary objective of the present invention is to define more efficient and versatile systems for absorbing radiant heat emanating from a source external to the system, such as solar heat, and for releasing it to a medium to be heated, by absorbing and releasing latent heat instead of sensible heat, and by maintaining continuously during operation the saturation temperature of the working fluid in this absorber just above the temperature of the medium (even when the temperature of this medium varies with time).

A still further objective of the embodiments of the present invention is to utilize radiant heat emanating from a source external to the system, such as solar heat, in practical, economical and cost-effective systems for specific heating applications.

Even further objects of the present invention reside in the utilization of standard components for adoption into the disclosed systems and the ease of maintenance and operation obtained.

A yet further object of the present invention is to provide a novel planar collector configuration whose absorbing surface is maintained at a uniform temperature, employs a refrigerant working fluid which can absorb a given amount of heat while it is in the collector, and release it to the medium to be heated, with the lowest possible mass flow rate.

Further objects and advantages will become apparent to those skilled in the art from the following description and accompanying drawings.

GENERAL DISCUSSION OF TYPICAL EMBODIMENTS OF PRESENT INVENTION

The embodiments described hereinafter relate to a typical application of the invention of special interest; namely, where the sun is the source of radiant energy. The medium heated can absorb sensible or latent heat or both. Applications include heating a sensible or latent heat reservoir, the air of a forced air heating system, the liquid of a hydronic heating system, or supplying heat for industrial or agricultural processes, or any other application requiring heat within the temperature range of the equipment and working fluid used.

In developing a preferred Rankine-type heat-transfer system (hereinafter referred to as a Rankine-type system) for any specific applications in accordance with the present invention, there are three central ideas common to all Rankine-type systems.

(1) The refrigerant flow must be controlled so that its liquid mass flow rate entering the absorbing means, or solar collector, hereinafter sometimes referred to as the evaporator, is under all operating conditions high enough for no, or at most a small amount of, superheat at the exit of the evaporator. Excess superheat will result in degradation of the performance of the absorbing means, or solar collection, and thus adversely affect the heating system. The amount of superheat that causes significant performance degradation, for example, that which increases collector heat losses to its surroundings by 2% or more, depends on the type of collector used. For example, in the case of a system employing a non-evacuated collector with a non-selective absorber coating and one transparent cover, even 5° F. of superheat may affect collector heat loss significantly. Any given system can be designed so that the superheat remains at a smaller value than a preselected upper limit.

(2) The refrigerant flow must be controlled so that its liquid mass flow rate entering the condenser is under all operating conditions low enough to prevent liquid from accumulating in the condenser in a large enough quantity to decrease significantly its heat-transfer efficiency. Such significant decrease in efficiency generally occurs when the condenser mean temperature difference for a given heat transfer rate is increased by 2 to 5%. In any event, a given system can be designed so that the condenser mean temperature difference for a given heat transfer rate does not exceed a preselected upper limit.

(3) The refrigerant flow must be controlled so that the temperature of evaporation is, under all operating conditions, at a temperature just above the temperature of condensation which, in turn, is maintained continuously, insofar as considerations of cost permit, at a temperature that exceeds that of the medium to be heated by an amount as small as possible, even when the temperature of this medium is changing with time. Preferably, the mean temperature of condensation should be 1°–2° F. below the mean temperature of evaporation and 10°–15° F. above the temperature of the medium to be heated. In any event, a given system can be designed so that the saturated vapor temperature of the refrigerant exiting the absorber (or collector) does not exceed the highest prevailing saturated vapor temperature in the condenser by a preselected amount.

The many embodiments that can be used to implement the foregoing three central ideas, or internal operating conditions of any system embodying my invention, can be best described by dividing into three general classes based on distinctions in the state of the refrigerant at the outlet of the radiant heat absorbing means, or evaporator.

In the first of the foregoing three general classes, referred to as Class A, essentially all the refrigerant exiting the evaporator outlet is a gas (vapor) in the saturated vapor state, namely, the quality of the vapor is one. In the second general class, referred to as Class B, essentially all the refrigerant exiting the evaporator outlet is a gas (vapor) in a slightly superheated state. In both these classes, the refrigerant flow through the evaporator varies depending upon the net heat absorbed in evaporator passageways. In the third general class, referred to as Class C, the state of the refrigerant is a wet vapor, namely, it contains a mixture of vapor and liquid phases, whose quality (i.e., the fraction by weight of the vapor in the mixture of liquid and vapor) will vary, depending on the operating conditions, between one and a minimum value just above zero, and the refrigerant flow through the evaporator is independent of the net heat absorbed in the evaporator passageways.

In developing the design of any particular embodiment in accordance with my invention, the external design operating conditions under which the system is required to operate includes the following four conditions:

(1) the prevailing radiation equilibrium temperature of the said absorbing means while the system is operating, as defined in my co-pending application, namely, the temperature that would be reached by the said absorbing means while no heat is being removed from said absorber by the refrigerant, namely, while no refrigerant is flowing through the said absorber's passageways;

(2) the prevailing equivalent temperatures of the surroundings of all components of said heating system, other than said absorbing means, where said equivalent temperature of the surroundings includes the effect of radiation losses or gains from the components of the heating system to the surroundings in addition to heat transfer losses or gains to the medium in which the system components are embedded, including the case where said medium is the surrounding (ambient) air;

(3) the temperatures of the medium to be heated at all points where heat is transferred from said refrigerant to said medium; and (4) the maximum design net heat absorption rate in the absorbing means, where net refers to the rate at which heat is absorbed by the refrigerant in the absorbing means.

DESCRIPTION OF THE DRAWINGS

FIGS. 2B, 2C, and 2D are sections along lines 2B—2B, 2C—2C, and 2D—2D of FIG. 2A and show three typical configurations of the evaporator passageways;

FIGS. 2E and 2F are side elevations of the novel evaporator along section lines 2E—2E and 2F—2F of FIG. 24 showing two different vapor header shapes;

FIGS. 3A and 3B are side illustrations of two forms of solar collectors containing the novel evaporator of FIG. 2A in which only solar energy is collected in the FIG. 3A form and both solar and thermal energy are collected in the FIG. 3B form;

FIG. 4 is a schematic illustration of the basic fluid loop configuration of the Class A systems in accordance with the present invention;

FIG. 7 is a schematic illustration of a typical system according to my invention in which refrigerant flowing is diverted to by-pass the condenser to a heat sink in order to prevent undesired pressure or temperature build-up;

FIG. 8 shows a schematic illustration of an alternate system to FIG. 7 for preventing undesired pressure or temperature build-up where the medium to be heated is water;

FIG. 9 is a schematic illustration of the basic fluid loop configuration of the Class C systems in accordance with the present invention;

FIG. 10 is a schematic illustration of a typical embodiment of a Class C system;

FIGS. 11A, 11B and 11C are schematic illustrations of other forms of gravity circulation flooded evaporators which can be used instead of that shown in FIGS. 2A-F in accordance with the present invention;

FIG. 12 illustrates a type of forced circulation flooded evaporator which can be used in accordance with my invention; and FIGS. 13A and 13B show alternate arrangements for connecting the liquid refrigerant reservoir to the liquid lines between the separator and condenser in the various systems of my invention.

DETAILED DESCRIPTION OF TYPICAL SOLAR COLLECTOR AND EVAPORATOR

In general, any solar collector configuration and, in particular, any of the conventional planar solar collector configurations used heretofore can be used in the instant invention.

Figure 1:
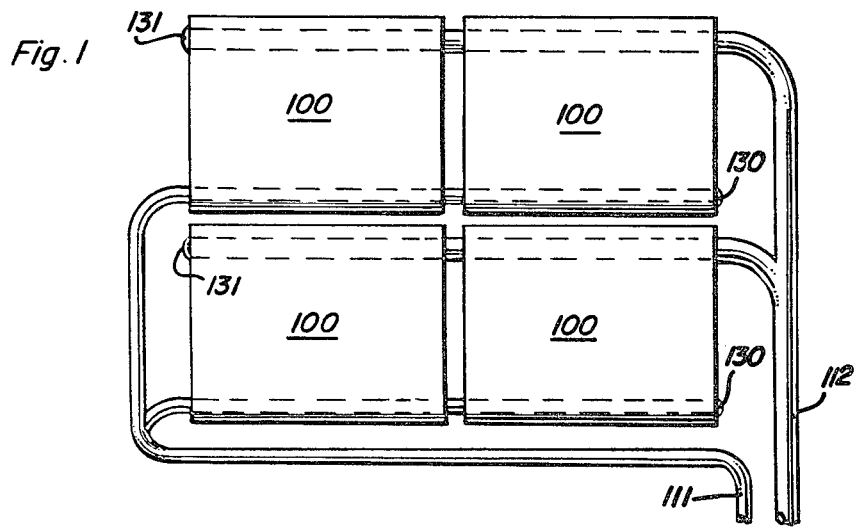
FIG. 1 is a schematic illustration showing a typical assembly of four solar collector module panels of the present invention.

A partial assembly of a typical solar collector configuration of my design containing only four modules is shown in FIG. 1. It will be appreciated that many modules can be required for even the smallest solar collector and the number obviously depends on the size of the collector desired. The modules can conveniently be assembled at the building site.

The evaporator 100A of each solar collector module 100 consists of a liquid distribution header 101, a vapor collection header 102, and a set of passageways 103 connecting the liquid header to its vapor header. The function of this set of passageways is to bring the liquid refrigerant to intimate thermal contact with its sheet metal panel 104. The sheet metal panel 104, which extends over the entire surface of the solar collector module between the two headers 101 and 102 may be an integral part of the set of passageways 103, or may be a separate sheet of absorbing material in intimate thermal contact with the set of passageways, and joined to them by a process such as brazing or welding.

In the former case, the heat absorbing (metal) panel 104 itself may either consist of raised and depressed areas joined to another metal panel 105 with matching raised and depressed areas in such a way as to form channels, joining its liquid and vapor headers, through which the liquid refrigerants could flow, or it may be flat and joined to another sheet which has raised and depressed areas (see FIG. 2).

Such channels 103 could be typically joined by two fluted panels, joined together by seams 106 (which may be brazed, bonded or welded seams), whose flutes may have axes perpendicular to the axes of the two headers. It is important to note, from the viewpoint of cost, that these seams need not be leak proof. In fact, from a functional standpoint, the two sheet metal panels could be two parallel plane sheets spaced, say, one eighth to one quarter of an inch apart. These two parallel panels are joined together only by leakproof seams 107 along its two panel edges perpendicular to the headers. The purpose of the intermediate seams is solely to increase the structural strength of the evaporator to allow a pressurized fluid at a pressure of up to, say, 250 to 300 lb/in$^2$ to be contained between two thin metal sheets, say, one eighth of an inch thick or less.

In the case where the sheet of absorbing material is not an integral part of passageway 103, the passageways may be a set of approximately parallel tubes 108 (see FIG. 2) joined to the panel 104. The absorbing panel 104 is joined to the headers 101 and 102 by brazed or welded seams 109 and 110, and so is the second panel or the tubes, as applicable.

The liquid header 111 distributes liquid refrigerant to the set of passageways. The headers 111 of the various panel modules 100 are connected together and feed by the liquid manifold 111 as shown in FIG. 1. The vapor header collects the refrigerant vapor that has been formed in the passageways of the evaporator by solar heat and passes it to vapor manifold 112. The vapor headers are connected together and to the vapor manifold as shown in FIG. 1. The ends 130 and 131 of the liquid and vapor headers that are not connected to another header are capped.

The liquid and vapor headers have orifices located so as to communicate with the passageways.

The purpose of the passageways is to distribute liquid refrigerant over the heat absorbing panel 104 so that the liquid can be evaporated (boiled) efficiently by the solar radiation impinging on and absorbed by panel 104, and the resulting vapor bubbles can escape to the vapor header.

Figure 2A:
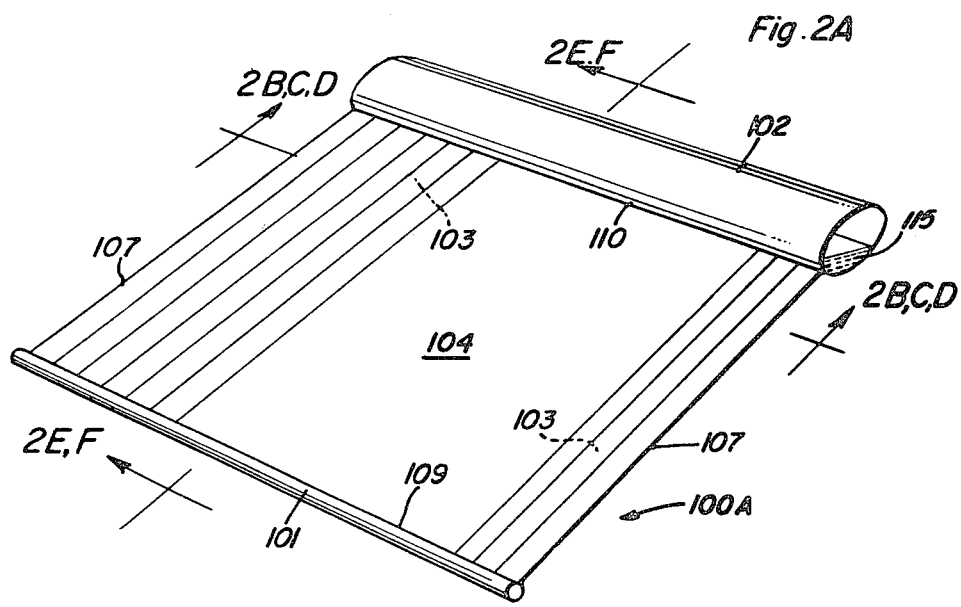
FIG. 2A is a perspective view of the evaporator in which the refrigerant is evaporated in the solar collector in accordance with the present invention.
Figure 2B:
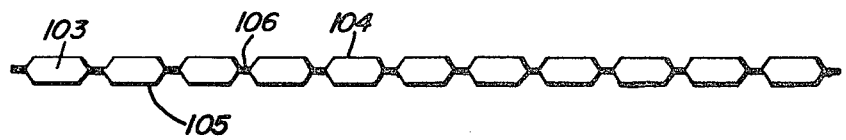

Depending on the layout of a particular installation, it may be desirable to provide additional oil return paths to that provided by the manifold by tapping small tubes (not shown) into the line formed by the serially connected liquid headers at appropriate intervals. The slope of panel 104 must be such that the equilibrium level 115 (see FIG. 2A) of the liquid in the vapor header is high enough to keep the passageways 103 filled with liquid to ensure efficient evaporation, but not so high as to restrict significantly the flow of vapor in vapor header 102. Also, the passageways 103 must be connected near the "bottom" of the vapor header 102 as shown in FIGS. 2E and 2F, where x—x is a horizontal reference line. The vapor header need not have a circular cross-section and elliptical shapes such as shown in FIG. 2F are also acceptable.

There are a large number of different ways the evaporator 100A shown in FIG. 2A could be incorporated into a complete solar collector module. No novel attachments or configuration are claimed for the overall module. However, for illustration, two typical configurations of an overall module are shown in FIGS. 2A and 3B.

In the FIG. 3A configuration, the refrigerant in the evaporator is used to absorb only solar radiation. The evaporator consists of liquid header 101, vapor header 102, absorbing panel 104, lower panel 105 which, together with panel 104, forms the passageways 103. The evaporator is contained within the external structure 116 and cover plate 117, which is transparent to solar radiation frequencies contained in the frequency spectrum corresponding to the temperature of the absorbing panel 104.

The space between the evaporator 100A and the structure 116 is filled with insulation 118. The space between the cover plate and the evaporator is airtight. Non-permeable insulation material is provided at 120, 121, 122 and 123, where the structure 116 comes in contact with the evaporator panels 104 and 105.

In the FIG. 3B design, the evaporator 100A is also used to absorb heat from the air surrounding the collector module. The space 119 is airtight when solar heat is used as the source of free energy, and open to the surrounding air when the thermal energy of the atmosphere is used as the source of free energy. Suitable dampers are provided at each end of a row of modules for this purpose. In most cases, the collector module itself would consist only of the portion shown in FIG. 3B above the line y—y. The channel 111A below the y—y line being formed by the supporting structure such as the roof, wall, etc. on which the collector module is mounted.

Some of the advantages resulting from the novel evaporator configurations and operation described heretofore are as follows:

(1) all of the solar collector heat absorbing panels are maintained at approximately the same uniform temperature say within 1°-2° F.;

(2) the speed of the liquid refrigerant in the passageways is low, typically one or two feet per minute, and is independent of the number of modules connected in a row; thus friction is negligible;

(3) the optimal size of the passageways is unaffected by the number of modules connected in series and hence also by the overall size of the solar collector. Thus, only the optimal size of the headers is affected by the number of modules connected in series, and oversizing only these headers, as opposed to oversizing all the passageways (tubing), for small installation so that they can also be employed for large installation entails only a small penalty in cost. Hence, for example, a single solar module design could be used for solar collection from, say, 600 to 12,000 square feet, and perhaps only one additional design for sizes between 8,000 and 160,000 square feet.

DETAILED DESCRIPTION OF CLASS A EMBODIMENTS

The preferred type of evaporator in the Class A embodiments of the present invention have been referred to by me in my co-pending application Ser. No. 457,271, now U.S. Pat. No. 4,211,207, as a "flooded evaporator," as illustrated, for example, in FIG. 2A. A flooded evaporator is functionally similar to the type of evaporator known to those skilled in the refrigeration art as a flooded coil evaporator and to those skilled in the steam power plant art as a boiler. The functional similarity of the flooded evaporators used in Class A systems, to those used in prior art refrigeration system, lies in the fact that the excess liquid refrigerant that is not evaporated in the passageways exposed to the incident radiation is returned directly to the evaporator (or boiler) passageways (coils), and in particular to the passageways inlet (or inlets). This includes evaporators whose passageways (coils) are not necessarily kept completely full of liquid refrigerant and thus includes overfeed evaporators. I use the term "passageways" in the same context as in my copending application Ser. No. 447,271 because the fluid ducts in which the refrigerant is evaporated need not physically have the configuration usually associated with the term "coil", but can consist of straight parallel tubes, shown in FIGS. 2A-F, which may be laterally interconnected at a number of points, or may consist entirely or in part of circuitous paths (as for example, those formed by the embosed pattern used in some absorber collector plates made by Olin Brass).

The excess liquid which is not evaporated by radiant heat in the passageways may either be returned to the evaporator inlet by the action of gravity alone, or may be returned to this inlet by employing a pump that accomplishes, or assists in accomplishing, this return. In the former case, the evaporator is referred to as a gravity-return or gravity-circulation flooded evaporator. In the latter case, the evaporator is referred to as a forced-circulation or controlled-circulation evaporator.

GRAVITY-CIRCULATION FLOODED EVAPORATORS FOR CLASS A SYSTEMS

Typical flooded evaporators are disclosed in FIGS. 2A-F. In this form of evaporator, the vapor-header incorporates a liquid-vapor separator combined as a single unit with the evaporator, and the excess liquid is returned to the evaporator portion by the same passageways in which the liquid refrigerant is evaporated. Other forms of gravity circulation flooded evaporators contemplated for the present invention are shown in FIGS. 11A, 11B, and 11C. FIG. 11A illustrates the case where the passageways 1 are inside the collector assembly or collector module 2, and the liquid header 3, the vapor header 4, the separator 5 and the path(s) 6 for returning the excess liquid are all physically distinct parts outside the collector assembly or module. FIG. 11B illustrates the case where all evaporator functions are again performed by physically distinct parts, but in this case, all these parts are located inside the collector assembly or module. FIG. 11C illustrates the case where again all evaporator functions are performed inside the collector assembly or module, but the separator and vapor header have been combined into a single physically indistinguishable unit identified as 4,5.

In the case of the evaporator of FIG. 2 (where the excess liquid is returned by the same passageways as those where the liquid is evaporated), liquid and gas (vapor) flow may—if the passageways are large enough—occur simultaneously in the same passageway segment, i.e., the gas flows upwards and the liquid flows downwards. This type of flow is referred to by those skilled in the art as "sewer-type flow". This type of flow may occur in certain segments of liquid passageways, while simultaneously only gas flow or liquid flow occurs in others. Moreover, which type of flow occurs in a given passageway segment may change with time, for example, in the special case where the liquid passageways are straight parallel tubes. Then, in the early morning, the tubes on the east edge of the evaporator that are fully or partly shadowed by the frame may provide most of the liquid return paths, while in the late afternoon, the tubes on the west edge of the evaporator, which may now be fully or partly shadowed by the collector frame, may perform this function. At the same time, sewer-type flow may be occuring in the tubes at the center of the evaporator.

The case where evaporation and excess liquid return occur in the same passageways is usually found in collectors which have separate (straight) tubes and absorber plates (fins) joined together and it is thus not economical to provide a very large number of very small tubes spaced closely together. Where very small passageways are used (because closely spaced small passageways can be obtained at no cost penalty), the same passageways cannot be used both to evaporate the refrigerant and to return the excess liquid. This is the case with evaporator passageways manufactured according to the "Roll-Bond" process of Olin Brass Company, which can have internal dimensions as small as 0.065 in. high by 0.18 in. wide without cost penalty. In this case, it may be more economical to employ a separate separator such as separator 4 as illustrated in FIG. 11A, which is not integrated into the vapor header and also located outside the collector assembly.

FORCED-CIRCULATION FLOODED EVAPORATORS FOR CLASS A EMBODIMENTS

These can employ separators which are an integral part of the evaporator vapor header, or a physically distinct separator inside or outside the collector assembly as illustrated in FIGS. 2A-F and 11A-C. An example of a forced-circulation flooded evaporator corresponding to the gravity-circulation flooded evaporator shown in FIG. 11A is shown in FIG. 12. In nearly all cases, the separator must be equipped with either a proportional liquid level sensor employed to control the mass flow rate delivered by the pump 8, or at least with a low-level limit switch 7 to stop the pump 8 if the liquid level 9 in separator 5 falls below a preselected minimum level. In the case of proportional liquid level control, the variable mass flow rate can be achieved by, for example, varying the speed of the pump or varying the opening of a valve in series or in parallel with the pump. The said proportional liquid level sensor may be a differential pressure transducer which effectively weighs the liquid column in separator 5, or a proportional, or a discrete multi-level liquid surface-level sensor.

BASIC FLUID LOOP CONFIGURATION OF CLASS A EMBODIMENTS

The basic fluid loop components and the manner in which they are interconnected is shown in FIG. 4. These elements are a flooded evaporator (or evaporator/separator combination) 11, examples of which are shown in FIGS. 2A-F, 11A-C, and 12, a condenser 12, a refrigerant reservoir 13, and a pump 14. In the steady state—which is used by those skilled in the art of servomechanisms to descrbed conditions under which parameters external to the servo loop vary at a rate much slower than the speed of response of the loop—the refrigerant, as it moves around the fluid loop in the Class A embodiments, traverses the thermodynamic states shown in FIG. 5 of my co-pending application Ser. No. 457,271. Thus, the refrigerant always exits evaporator stage 11 in the saturated vapor state, which is automatically achieved by the flooded evaporator within its operating range of flow rates, provided it is adequately charged with liquid refrigerant.

In the special limiting case mentioned on page 29 of my aforesaid co-pending patent application, and discussed further in this application on pages 34–50, pump 14, and reservoir 13, can be omitted and the cycle sustained by the absorbed radiant energy and the action of gravity alone.

CONTROL SYSTEM FOR CLASS A EMBODIMENTS

The purpose of the control system is to implement the three central ideas stated on pages 6–7 of this specification.

In all three classes of embodiments, the third central idea requires that no throttling (pressure reducing) device be used in the gas (vapor) line between the evaporator and the condenser to control the flow of the refrigerant, except in some very special cases, such as multiple media to be heated at different temperatures, and only during transient conditions when switching from a lower to a higher temperature.

In the case of Class A embodiments—which use flooded evaporators or a separate separator element to ensure that only saturated vapor is exiting from the evaporation stage—the second central idea is implemented automatically by the evaporator stage itself provided the upper limit of the mass flow rate entering the evaporator does not exceed the capability of the evaporator (or evaporator and separator) to return excess refrigerant, not vaporized in its passageways, to its inlet under the prevailing external conditions. Consequently, one purpose of the control system in Class A embodiments is to prevent the mass flow rate of the refrigerant entering the evaporator from exceeding this upper limit. The other purpose of the control system is to maintain the mass flow rate of the refrigerant entering the evaporator at a high enough rate to keep the evaporator passageways filled with sufficient liquid refrigerant to prevent the refrigerant vapor exiting the evaporator from departing significantly from the saturated state—by maintaining the amount of superheat within say 1° C. (1.8° F.)—under all external conditions.

For given external conditions, the range of mass flow rates which lie within the upper and lower limits thus defined depends on design details of the particular evaporator used, but is in general very broad. Thus, by using a flooded evaporator, the accuracy with which the control system must regulate the mass flow entering the evaporator is in general quite low so that a simple and inexpensive control system can be used. This would not be true if an evaporator of the type employed by Class B systems were used which resembles in some ways evaporators often referred to by those skilled in the art as "dry evaporators".

As explained at length in my co-pending application, Ser. No. 457,271, the refrigerant mass flow rate produced by the pumping means should ideally match the net rate at which radiant heat is absorbed by the evaporator. The use of a flooded evaporator allows the estimate of this net rate to be fairly rough and the computation and control of the corresponding mass flow rate can therefore be only approximate.

A large number of different methods can be employed to obtain estimates of the refrigerant mass flow rate that matches the net rate at which radiant heat is being absorbed (by the refrigerant) in the evaporator. The feasibility of some of these methods depends on the nature and heat capacity of the particular medium to be heated and will not be discussed here. However, three methods that do not depend on the characteristics of the medium to be heated will be discussed.

The first method consists in first estimating the net rate at which radiant heat is being absorbed, primarily by temperature measurements, computing the matching refrigerant mass flow rate, and controlling the refrigerant mass flow rate entering the evaporator accordingly. This method includes the measurement of the "radiation equilibrium temperature" as defined on pages 16 and 17 of my co-pending patent application, Ser. No. 457,721, as well as other measures of insolation. With a flooded evaporator, a collector with at least one transparent cover and a not too wide operating temperature range, an estimate as crude as that obtained from equation (4), on page 22 of the said patent application, with $k_e$ and $h_{fg}$ assumed constant (which prior application makes clear they are not) is often adequate. A more accurate expression for the desired mass flow rate could be based on the more sophisticated expression for the net amount of heat absorbed given in claim 41 of the said application in connection with heat pumps with the coefficients $k'_e$, $k'_e$ and $k'''_e$ represented, for example, by quadratic functions of $(t_{eq}-t_a)$, $(t_{es}-t_a)$ and $u_{ex}$, respectively, where in the case of solar radiation $u_{ex}$ would be the appropriate component of the wind velocity in the vicinity of the solar collector. A further refinement would be for $t_a$ not to represent the temperature of "the external fluid", which is the ambient air in the case of a solar collector, but the so-called "equivalent temperature of the surroundings" which includes the effects of the radiation losses of the collector to its surroundings. This first method of obtaining an estimate of the desired mass flow rate, and controlling this rate accordingly, could in theory be used if perfect measurements and computations were made by using the so-called dry evaporator, mentioned later on page 46 with only a small loss in efficiency. In practice, if such an evaporator were used, the accumulated effects of bias errors would require an upper level limit switch (in addition to the lower level switch 272 in refrigerant reservoir 210 shown in FIG. 4 of my co-pending patent application) to prevent the condenser from becoming flooded. The on-off duty ratio of the pump would depend on the accuracy of mass flow rate control and on the capacity of the refrigerant reservoir. Such an arrangement is clearly not a preferred one.

An example of a sophisticated control system for implementing this first method is illustrated in FIG. 4 of my co-pending patent application No. 457,271. The purpose of the mass flow measurement is to increase the speed of response of servo loop controlling motor (250), and the purpose of the throttle is to speed up increases in evaporator temperature when a number of media are being heated and the temperature of each medium heated is higher than that of the preceeding one.

The second method of control consists in estimating the net rate at which radiant heat is being absorbed by the refrigerant in the evaporator by measuring essentially directly the refrigerant mass flow rate, and controlling the refrigerant mass flow rate entering the evaporator accordingly. This can be accomplished by inserting in the fluid loop, shown in FIG. 4, a volumetric flow rate transducer between the exits of evaporator 15 and the inlet of pump 14; preferably however, the refrigerant mass flow rate can be measured by a liquid flow rate transducer between the exit of condenser 12 and refrigerant reservoir 13 in FIG. 4. The mass flow rate estimate obtained from this transducer corresponds to the rate at which the refrigerant is being vaporized in the evaporator since the flooded evaporator or evaporator/separator combination 11 ensures that only saturated vapor exits the evaporator stage and hence only condensed vapor exits condenser 13. To protect pump 14, a low-level limit switch (not shown), located in the refrigerant reservoir, may also be used in this method.

The third method of control consists in estimating the net rate at which heat is being absorbed by the refrigerant in the evaporator by measuring the liquid level of the refrigerant in reservoir 13 and essentially controlling the refrigerant mass flow rate entering the evaporator as a function of that level. Because a specific embodiment of the first method is fully disclosed in my aforesaid copending patent application, and because at the approximate time of filing this application, the installed costs of the components identified for implementing this third method are less than those identified for implementing the second method, I have chosen to describe this third method hereinafter as part of specific embodiments of the Class A Systems.

SPECIFIC EMBODIMENT OF CLASS A SYSTEMS WITH CONDENSATE PUMP

Figure 5:
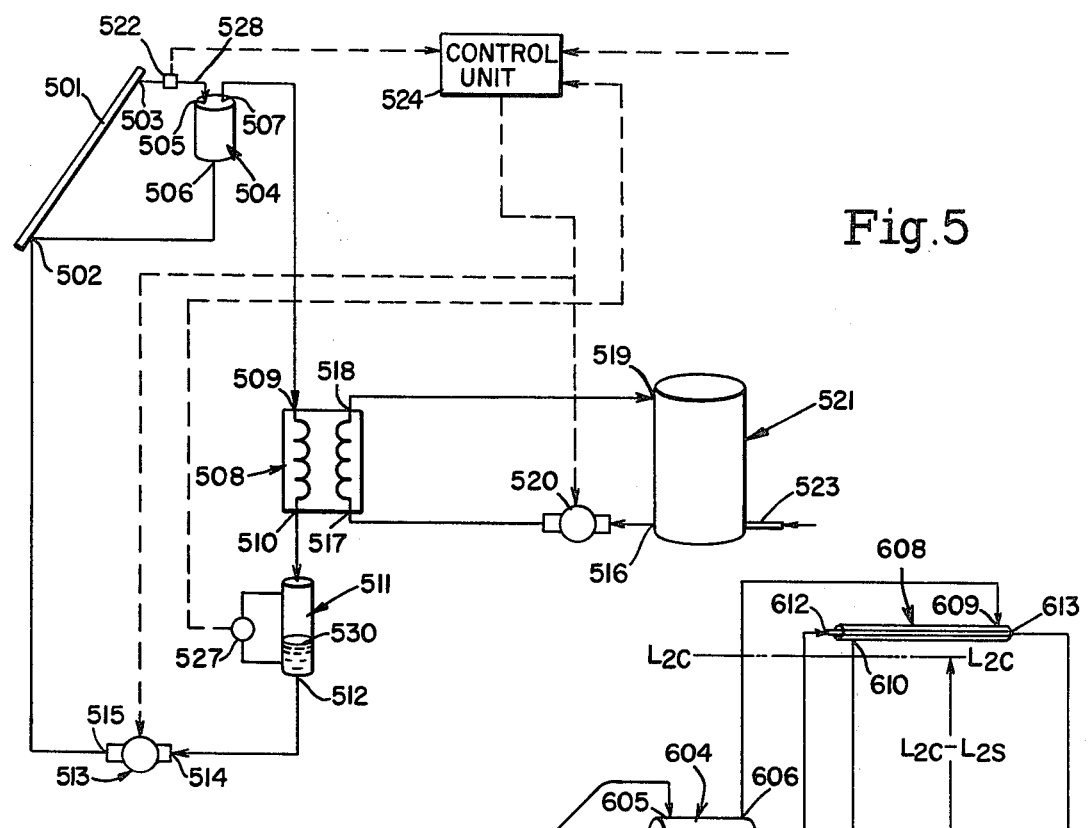
FIG. 5 is a schematic illustration of a typical embodiment of a Class A system utilizing a condensate pump.

In this system, as shown in FIG. 5, the refrigerant enters evaporator passageways 501 at 502 in the liquid phase. In the passageways, the refrigerant absorbs heat by evaporation, and exits at 503. After leaving the passageways 501, the refrigerant enters separator 504 through line 528 at 505, and any entrained refrigerant liquid is separated from the vapor. The liquid exits the separator at 506 and is returned by gravity to the entrance to passageways 501 at 502. The vapor exits the separator at 507, enters condenser 508 at 509, and releases heat to the medium to be heated by condensation. The liquid refrigerant exits the condenser 508 at 510, and enters refrigerant reservoir 511. The liquid refrigerant exits this reservoir at 512, enters pump 513 at 514 and exits at 515, and is returned by the pump 513 to the entrance 502 to the evaporator.

The heat released by condensation of the refrigerant in condenser 508 is absorbed by the medium to be heated. In this example, the medium or substance being heated, or to be heated, is a liquid, for example water, circulated by pump 520 in a water circuit which includes condenser 508 and water storage tank 521. Water stored in tank 521 exits at 516, enters condenser 508 at 517 and, after being heated by the heat released by the refrigerant, exits at 518 and returns to storage tank 521 at 519. Refrigerant pump 513 of the Rankine-type system and water pump 520 are controlled automatically by control unit 524. The water pump 520 is started when the refrigerant temperature at exit 503 of the evaporator passageways 501 exceeds the temperature of the water near the bottom of heat reservoir 521 by a pre-selected amount, say about 2°–10° F., typically 5° F., and is stopped when this temperature approaches the water temperature.

The refrigerant temperature at the exit of the evaporator passageways 501 is measured by temperature trandsucer 522, and that of the water near the bottom of reservoir 521 by temperature transducer 523. The foregoing two temperatures are monitored by control unit 524, which in turn operates relays (not shown) to start and stop pumps 513 and 520.

Refrigerant pump 513 is started whenever liquid level 530 in refrigerant reservoir 511 exceeds a prescribed minimum level by a pre-selected amount and the refrigerant temperature at collector exit 503 exceeds the temperature of the water near the bottom of reservoir 521 by the preselected amount mentioned above. Refrigerant pump 513 is stopped whenever either:

(a) liquid level 530 falls below a prescribed minimum level, preferably about one-quarter full; or (b) the refrigerant temperature at exit 503 approaches the temperature of the water near the bottom of reservoir 521. While the heat-transfer system is operating, the speed of the refrigerant pump 513 is controlled by level 530 of the liquid in the refrigerant reservoir. The pump should be of the variable capacity type, and inparticular of the variable speed type. The pump runs at its maximum capacity when this reservoir is full of liquid and stops when the reservoir is at the prescribed minimum level. Between these two liquid levels, the pump runs at a capacity which increases with increasing liquid level.

Separator 504 insures that only refrigerant in the vapor phase enters condenser 508. The rate at which the refrigerant is condensed, and returned to the collector is, under steady-state conditions, proportional to the rate at which the refrigerant is evaporated in the collector by solar heat. Consequently, a rising refrigerant level in refrigerant reservoir 511 indicates that the rate at which the pump 513 is returning liquid refrigerant to the collector is lower than the rate of evaporation. To correct this condition, the refrigerant mass flow must be increased by increasing the speed of pump 513. Conversely a falling refrigerant level in the reservoir indicates that the rate at which the pump is returning liquid refrigerant to the collector is higher than the rate of evaporation.

It follows from the preceding discussion that a rising liquid level in refrigerant reservoir 511 indicates that the collector is being "starved" and that the refrigerant pump speed should be increased. Conversely, a falling liquid level in this reservoir indicates that the collector is being overfed and that the refrigerant pump speed should be descreased. Liquid level transducer 527 is employed to measure liquid level 530. This information is sent to the control unit, which in turn uses it to control the speed of pump 513 and to stop it if the level falls below a selected minimum value. Under steady-state conditions, the correct pump speed conditions are reached when liquid level 530 remains at a constant height. For a given net rate of heat absorbed by the collector, there exists a unique corresponding correct height. For the designed maximum value of this net rate, the correct liquid level 530 is near the top of refrigerant reservoir 511; and for the designed minimum value of this rate, the correct liquid level 530 is a little above the aforementioned minimum level, which preferably corresponds to a refrigerant reservoir about one-quarter full.

The separator 504, by allowing only vapor to enter the condenser 508, ensures that correct speed control of refrigerant pump 513 is achieved not only by increasing its speed with increasing liquid level 530, but conversely by decreasing its speed with decreasing level 530. This separator 504 also allows the refrigerant level in the passageways 501 to vary considerably without affecting passageway efficiency. The variation in refrigerant level results only in a variation in the quantity of liquid entering the separator 504 and being returned to the inlet of the collector at 502. The amount of refrigerant in the system is chosen to give an adequate refrigerant level in the passageways to avoid superheating at the vapor exit and at the same time to fill the liquid return piping and to fill the refrigerant reservoir 511 up to its maximum level. Satisfactory evaporation without superheating, or liquid slugging through the separator into the condenser, will then be obtained over a wide range of insolation and over the full range of liquid refrigerant levels in the reservoir.

The wide tolerance of operating liquid levels in the collector allows the refrigerant reservoir 511 to function as a buffer between the pumping rate and the collector evaporation rate. This permits the use of non-linear or stepped level sensors and a simple motor speed control which does not use tachometer or flow-rate feedback. The buffer action also permits transients in insolation, in condensation rate, or in pumping rate to take place without affecting the efficiency of heat transfer or the stability of system control. Thus, an inexpensive and simple control system can be used to vary the refrigerant pump speed.

The Rankine-type system is self-protecting in the event of a power supply failure and also for most equipment failures. With insolation present, but refrigerant pump 513 not operating, all the refrigerant in the collector will collect in the liquid piping, the liquid refrigerant reservoir 511, the condenser 508, and the vapor piping by the process of gravity and vapor migration. While the refrigerant is evaporating from the collector and condensing in other parts of the system, the temperature of the collector is held close to the condensation temperature until starvation commences and the exiting vapor becomes superheated. The temperature of the more elevated parts of the collector will rise, but the vapor pressure remains close to that of the condensation temperature at all times, and will be below maximum operating pressure even when there is no liquid refrigerant at all left in the collector. Thus, the system and the invidivual components, should be sized so that the entire refrigerant charge can drain into the other parts of the fluid circuit below the bottom of the evaporator, such as the condenser and/or piping, so that none remains in the evaporator in the event of malfunction.

This self-protection design prevents destructive pressure build-up in the collector, even though the panel temperature approaches stagnation temperatures and also limits temperatures in other parts of the system because there is negligible heat transfer from the superheated vapor in the collector. The working fluid is also protected from excessively high temperatures in the stagnation condition, except for the small amount present as superheated vapor in the collector.

It will be clear to those skilled in the art which features of the above-described specific embodiment, such as overpressure protection, apply to other Rankine-type configurations. It will also be clear to such persons that the steady-state thermodynamic cycle described in my earlier application, Ser. No. 457,271, and depicted by ABCDE in FIG. 5 of the said patent application, applied to all Class A embodiments that use an active element, such as a pump, to return the condensed vapor exiting condenser 12 in FIG. 4 to the evaporator inlet 15.

SPECIFIC EMBODIMENT OF CLASS A SYSTEMS WITH NO CONDENSATE PUMP

As stated on page 29 in my co-pending application, if the centerlines of all the refrigerant piping are in the same horizontal plane, the cycle, once started, is self-sustaining in the absence of friction, and needs no pump. Under these ideal conditions, the cycle also operates optimally without the help of a pump. As differences in elevation of the system components increase, or friction is increased by using smaller diameter piping, etc., the amount of heat transferred from the solar collector decreases. Further, if the elevation difference is excessive, the cycle is no longer self-sustaining.

In the case of a tilted collector, the differences in elevation will, in general, not be excessive, and therefore no pump is needed, if the condenser is located near or above the level of the top of the solar collector and, therefore, implicitly above the evaporator passageways. The pump which is eliminated is the pump employed to return the condensed vapor exiting the condenser to the evaporator inlet and does not preclude using a forced-circulation evaporator. However, in most cases where no condensate pump is used, it is preferred that the evaporator employed be a gravity-circulation flooded evaporator or an evaporator/separator system in which the liquid refrigerant from the separator exits and returns by gravity to the evaporator inlet.

The general configuration of the fluid loop is obtained by omitting pump 14 and rrefrigerant reservoir 13 from the system illustrated in FIG. 4. The only purpose of the pump 14 as earlier disclosed is to offset the static head resulting from the difference in effective liquid levels in the collector and the condenser. The static head resulting from the vapor in the vapor passages is negligible and is not taken into account in the foregoing statements. In this class of embodiments there is no "negative" static head that needs to be offset, or overcome, by the pump to keep the liquid refrigerant at an acceptable level in the solar collector. On the contrary, there exists a "positive" static head that could maintain this liquid level without employing a pump by having the condenser positioned above the solar collector passageways. Whether this "positive" static head can actually maintain this level depends on whether the system is correctly designed and, in particular, on whether the friction-induced pressure drop around the fluid circuit (loop) is small enough for the "positive" static head to establish high enough mass flow rates at high evaporation rates.

Figure 6:
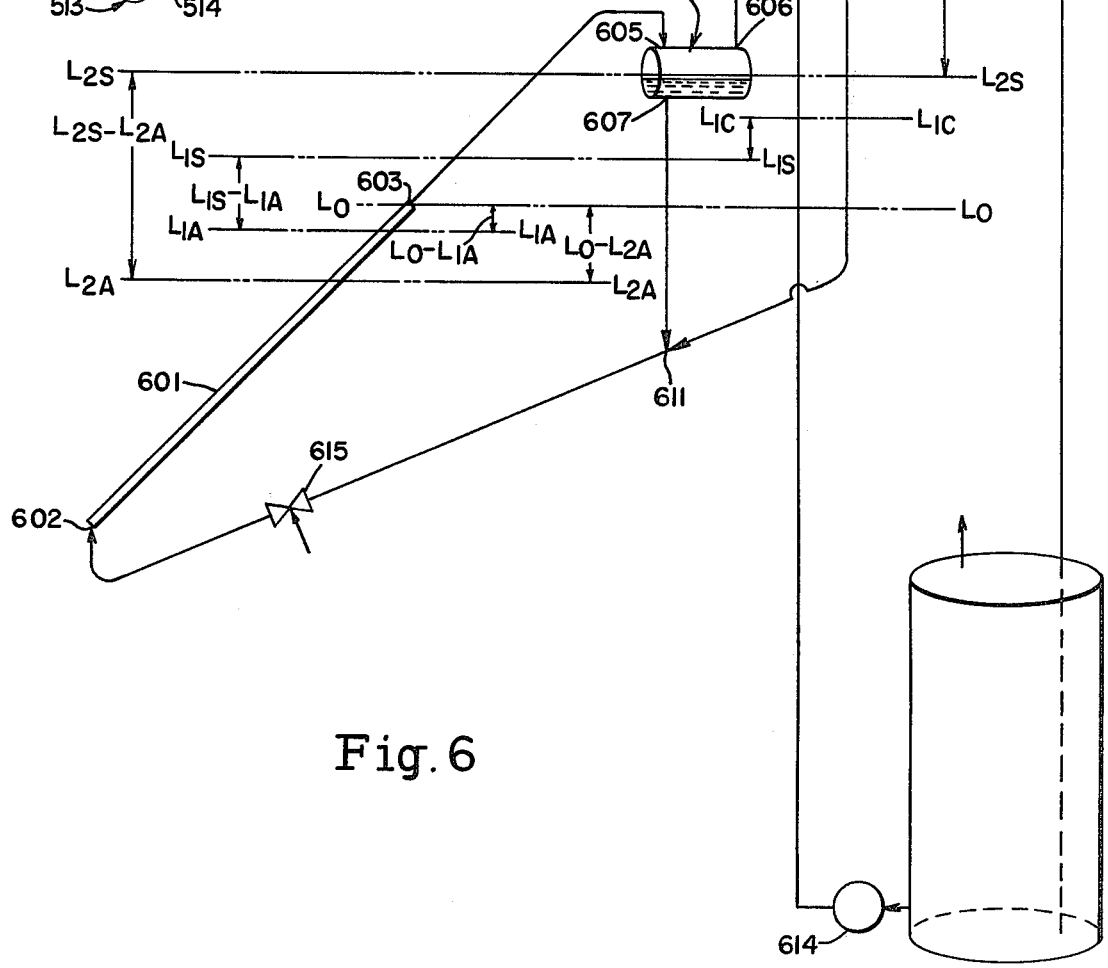
FIG. 6 is a schematic illustration of a typical embodiment of a Class A system where the components are arranged to return liquid refrigerant to the evaporator without the assistance of a condensate pump.

A typical class A system with no condensate pump is shown in FIG. 6. The refrigerant enters evaporator 601 at 602 and exits at 603. The refrigerant then enters separator 604 at 605 where the vapor and liquid phases separate in such a way that the vapor exits at 606 and the liquid at 607. The separator 604 is positioned with respect to evaporator outlet 603 so that the level of accumulated liquid in the separator, or in the piping connected to separator outlet 607, is above evaporator exit 603. The refrigerant gas from the separator 604 enters the condenser 608 at 609 and exits in the liquid phase at 610. As with the separator 604, the condenser 608 is positioned with respect to the evaporator outlet 603 so that the level of accumulated liquid in the condenser, or in the piping connected to condenser outlet 610, is above evaporator exit 603. The liquid referigerant exiting from the separator 604 and condenser 608 merges at some point, say at 611, in advance of the evaporator entrance 602 for return to the evaporator 601.

The medium to be heated, such as water, enters the condenser 608 at 612 and exits at 613. If the bottom of the heat reservoir (hot-water storage tank) containing the water supplied to the condenser is above the top of the condenser, the water may be circulated by thermosiphon action alone. In general, however, a pump 614 is provided to circulate the water around the reservoir-condenser fluid circuit (loop) and the level of the heat reservoir is below the level of the condenser.

The refrigerant should preferably be charged so that absorber 601 is completely filled with liquid refrigerant (when the entire refrigerant circuit is at a uniform temperature). This will ensure that the refrigerant vapor exiting the absorber at 603 is not superheated under any operating condition. A small reduction in this charge will cause superheat to appear at low radiant heat absorption rates, and additional reduction in this charge will result in increasing the degree of superheat at a given radiant heat absorption rate, and in causing superheat to persist at successively higher absorption rates with a resulting even increasing degradation in performance.

In field-assembled systems of the type shown in FIG. 6, there usually exists sufficient latitude in locating the relative heights of the various components to permit proper operation without difficulty. However, in factory-assembled split systems, and especially in factory-assembled single-unit systems, the requirement to produce compact units imposes severe constraints on the spatial relationship of key components.

In understanding the requisite spatial relationships, FIG. 6 is intended to show qualitatively the relative vertical distances between the top 603 of absorber 601, and the centerlines (not shown) of separator 604 and condenser 608. The line $L_o$-$L_o$ represents the level $L_o$ of the liquid refrigerant in absorber 601, and in refrigerant lines between 607 and 611 and 610 and 611 when the entire refrigerant circuit is at a uniform temperature. As shown, separator 604 and condenser 608 are located at a level above that of level $L_o$. If ports 605 and 606 of the separator and port 609 of the condenser were below this level, the separator and the condenser would be filled with liquid and could not perform their function.

Considering the case where radiant heat is absorbed by the refrigerant at a rate of $Q_1$, the amount of saturated liquid refrigerant in the collector is caused to decrease and the level of the liquid refrigerant in the line between 607 and 611 to rise. After steady-state conditions have been reached, the mean liquid level in the absorber will settle at, say, level $L_{1A}$ and the level of the liquid in line 607-611 at a level $L_{1S}$ such that the static head ($L_{1S}$-$L_{1A}$) balances the friction-induced pressure drop by the refrigerant flow around the circuit 603-605-607-611-602-603.

In this system, the pressure at points 603, 605, 606, 607 and 609 should be essentially equal. When this is the case, the liquid level in the refrigerant line 610-611 will settle at a level $L_{1C}$ such that the static head ($L_{1C}$-$L_{1S}$) is essentially equal to the friction-induced pressure drop in the condenser 608. Similarly, if the radiant heat is absorbed by the refrigerant at a higher rate $Q_2$, the mean liquid level in the absorber will fall further to say $L_{2A}$ and the levels in lines 607-611 and 610-611 will rise to the levels $L_{2S}$ and $L_{2C}$, respectively.

Thus, the magnitude of the static head ($L_{2S}$-$L_{2A}$) required to offset the pressure drop around the circuit 605-607-611-602-603-605 for a given flow rate is a function of the (friction-induced) pressure drop in the absorber and decreases with it. Hence, the minimum height of the top of the separator above the top 603 of the absorber necessary to allow the required static head to be provided—at the maximum design heat-absorption rate—without flooding the separator, is decreased by using absorbers with smaller pressure drops. Similarly, the minimum height of the bottom of the condenser above the top of the separator, necessary to allow the required static head to be provided—at the maximum design heat absorption rate—without flooding the condenser, is decreased by using condensers with smaller pressure drops.

Figure 6A:
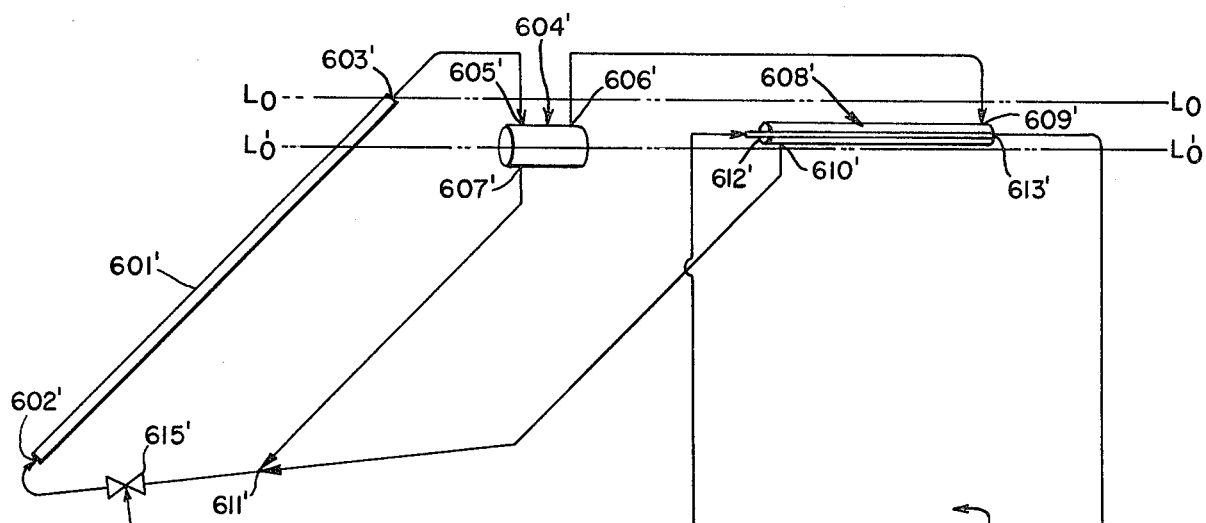
FIG. 6A shows the limiting case of the Class A system shown in FIG. 6.

Accordingly, the refrigerant pressure drops in the absorber and the condenser at the maximum design heat-transfer rate determine the minimum permissible vertical separation between the top of the separator and the top of the absorber; and between the bottom of the condenser and the top of the separator. FIG. 6A shows the typical limiting case where the separator 604 and condenser 608 are positioned at or near their permissible minimum relative heights with respect to the evaporator passageways 601 and each other. The components in FIG. 6A correspond to the components in FIG. 6 with the former designated with a prime. At the heights shown in FIG. 6A, if the absorber 601' is filled with liquid refrigerant, both the separator 604' and the condenser 608' would be flooded. On the other hand, if the liquid level in the absorber were lowered from $L_o$ to $L_o'$, and if the pressure drops in the absorber and separator were negligible, the system would operate without flooding the separator and the condenser. The lower level $L_o'$ will result in superheated vapor exiting the absorber at low heat absorption rates, with a resulting degradation in performance. However, the degree of superheat will decrease with increasing heat absorption rates. Usually, if 90% of the absorber is filled with liquid refrigerant, the degree of superheat should become zero before the maximum design heat-transfer rate is reached. Thus, FIG. 6A represents the limiting case where refrigerant pressure drops in the absorber and collector are negligible and some degradation in performance has been accepted (at low evaporation rates) for the sake of keeping the tops of the separator and condenser below the top of the absorber.

A horizontal separator has been shown in FIG. 6. A vertical separator may often be preferred—especially in the case of split systems. Also, a larger separator than necessary (horizontal or vertical) may be used to advantage, instead of a refrigerant reservoir (not shown in FIG. 6), in cases where the separator and condenser are located high enough with respect to the top of the absorber to allow the required maximum static head to be provided, but not high enough to allow the liquid refrigerant (displaced from the absorber) to be accommodated in the liquid lines at the maximum design heat absorption rate. In such cases, a larger separator or a separate liquid refrigerant reservoir may be used to accommodate the excess liquid provided this reservoir, or the portion of the separator intended to perform the function of a liquid refrigerant reservoir, is located above the liquid level at which the system is filled with refrigerant.

Figure 6B:
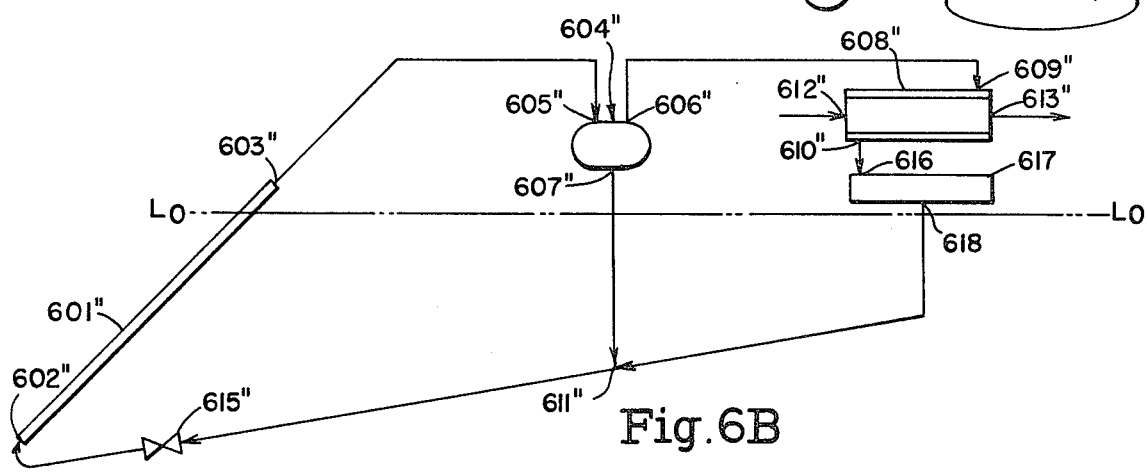
FIG. 6B shows the same type of circuit as FIG. 6 with a liquid refrigerant reservoir added.

FIG. 6B shows the case where both a separator and a liquid refrigerant reservoir are used. The components in FIG. 6B which correspond to the components in FIG. 6 have been designated by the same numeral with a double prime added. In FIG. 6B, liquid refrigerant exiting condenser 608" at 610", instead of being connected directly to mergence point 611", is connected to inlet 616 of liquid refrigerant reservoir 617. The liquid refrigerant in this reservoir exits at 618 and is returned to mergence point 611". A liquid refrigerant reservoir of the type known as a through-type receiver has been shown for the purposes of illustration. Also, for the purposes of illustration, reservoir 617 has been shown connected between condenser refrigerant outlet 610" and mergence point 611". However, liquid refrigerant reservoir 617 could have been connected alternatively either (1) between separator liquid outlet 607" and mergence point 611", or (2) between mergence point 611" and inlet 619 of valve 615". Some ways of connecting a liquid refrigerant reservoir to the refrigerant circuit are described in the first 13 lines of page 60 and illustrated in the figures associated with this description where, in particular, a surge-type receiver is shown in addition to a through-type receiver.

The differences in refrigerant liquid levels in the circuit branches 602-603-605, 605-607-611-602, and 610-611-602 when radiant energy is absorbed by the refrigerant in absorber 601 are caused primarily by the difference in the mean density of the refrigerant in circuit branches 602-603-604-605-606-609 and 602-611-609. This difference in density, in the presence of an essentially uniform gravitational field, is primarily responsible for providing the net force required to overcome the friction-induced refrigerant pressure drops which, in a well-designed system, occur primarily in the absorber passageways and in the condenser. By following the above-described refrigerant-circuit-related design considerations, one can ensure that the magnitude of the net force necessary to overcome friction-induced refrigerant pressure drops is sufficient to provide a refrigerant flow rate high enough for no superheat to appear at the outlet 603 of absorber 601 under all external design operating conditions provided the absorber passageways are completely filled with liquid refrigerant when the entire refrigerant circuit is at an uniform temperature. The existence under all design operating conditions of no, or negligible superheat, at the outlet 603 of absorber 601, together with the action of the separator, ensures that the maximum potential heat transfer efficiency of a two-phase cycle with a particular refrigerant is achieved.

Figure 6C:
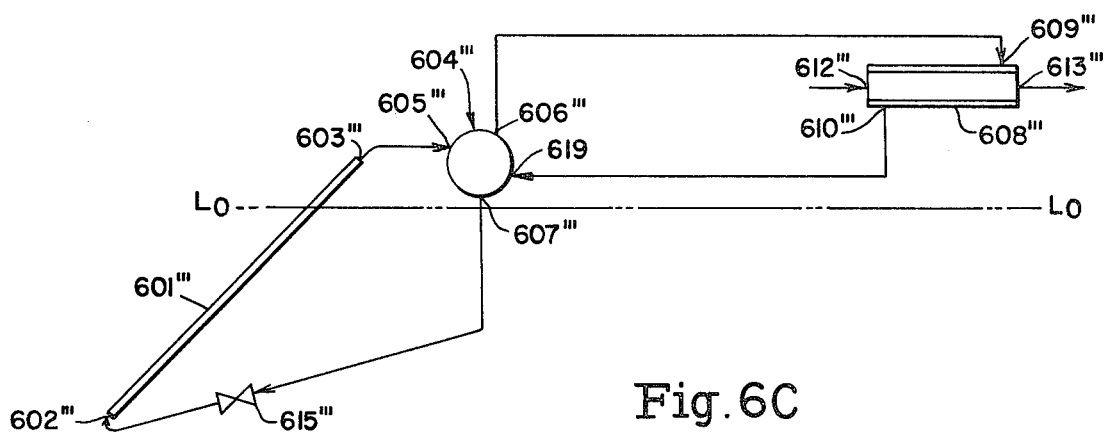
FIG. 6C shows an essentially functionally equivalent circuit to the circuit shown in FIG. 6.

FIG. 6C shows the case where the condensed refrigerant vapor exiting the condenser is returned to separator 604''' at 619 instead of being returned to mergence point 611'''. The components and points in 6C, which correspond to components and points, respectively, in FIG. 6, have been designated by a triple prime. From the viewpoint of obtaining a "self-regulating" system, over a range of operating conditions, which delivers dry refrigerant vapor to the condenser and which, for example, maintains the superheat of the vapor exiting the absorber at zero, the circuit of FIG. 6C is functionally equivalent to that of FIG. 6—provided separator liquid inlet 619 in FIG. 6C (which replaces mergence point 611 in FIG. 6) and mergence point 611'' in FIG. 6B are, under any given condition, both either immersed or not immersed in liquid refrigerant.

Significant reverse flow of heat from the medium to be heated can be prevented when the refrigerant in the evaporator is at a lower temperature than the refrigerant in the condenser and separator (which may occur, for example, during the night), either by (a) placing the level of the condenser outlet above the evaporator outlet by, say, at least one foot, so that the liquid level in the fluid circuit is below the condenser outlet, or by (b) placing a unidirectional flow device (e.g., a check valve) in the liquid line at the inlet to the evaporator oriented so as to prevent reverse flow, and by ensuring that the entire liquid charge can be accommodated by the components and tubing outside the condenser so that the liquid level of the refrigerant in such components and tubing remains below the level of the condenser outlet.

In order to protect the evaporator, and the other components of the system when the refrigerant is capable of exceeding the maximum design operating pressure of the evaporator, or other system component, it is necessary to control the system so that the refrigerant does not exceed this maximum design operating pressure. One method is to position in the merged return line 602-611 an automatically controlled valve 615 just ahead of the evaporator inlet 602. This valve 615 would preferably be, but is not limited to, an automatic two-position valve that can be operated in a so-called "fail-safe" manner. Namely, the valve would be normally kept closed in the absence of a control "signal" by, for example, a spring or weight, and would be opened by the control signal. The means employed to determine whether the refrigerant has exceeded its maximum design operating pressure may either be a pressure sensor or a temperature sensor. In the latter case, the operating pressure would be assumed to have been exceeded if the temperature exceeded the refrigerant saturated vapor temperature corresponding to the maximum operating pressure. Examples of pressure sensors are (a) pressure-actuated switches, in which case the valve would be actuated by an electrical signal and would probably be a solenoid valve (of the "normally-closed" kind); (b) bellows filled with a gas, in which case the valve would be actuated (closed) when the pressure exceeds the maximum operating pressure; and (c) bourdon-type pressure gauge mechanisms, in which case the valve would be mechanically actuated by the movement of the bourdon tube as it straightens out, as the pressure inside it increases, and it comes into contact with the stem of the valve. Examples of temperature sensors are (a) platinum resistance transducers, in which case the valve would be electrically actuated and usually be a solenoid valve; (b) bulbs containing a mixture of liquid and vapor of, for example, the same type of fluid as the refrigerant, in which case the valve would be actuated by the pressure of the fluid's vapor as, for example, in the case of a thermostatic expansion valve; and (c) bimetallic strips, in which case the valve would usually be mechanically actuated.

The sensing element of the foregoing sensors (not shown in FIG. 6) would preferably be located at some point in the evaporator 601 near the vicinity of the outlet 603 and, in the case of temperature sensors would either be immersed in the refrigerant, or would be in thermal contact with the tubing containing the refrigerant or with the absorbing surface in the vicinity of this tubing.

The presence of the automatically controlled valve 615 in this Rankine-type system of my invention prevents the refrigerant from exceeding its maximum design operating pressure in the event liquid refrigerant is temporarily trapped in the absorber passageways, because of equipment malfunction, or because the medium being heated reaches its maximum design temperature or pressure, and the system reduces the rate at which heat is transferred from the refrigerant to the medium being heated below the rate at which radiant heat is absorbed by the refrigerant. The presence of valve 615 prevents actuation of a pressure relief valve, or equivalent device, that would necessarily be incorporated in any practical system. Thus, the valve 615 would automatically prevent the liquid refrigerant from entering the evaporator passageways through inlet 602 whenever the refrigerant saturated vapor pressure exceeds a pre-selected value below, preferably by about 15 to 25%, the setting of the pressure relief valve, or below the setting of other safety means to dump the refrigerant if its pressure exceeds the safety device setting.

The liquid refrigerant must also be prevented from entering the evaporator through its outlet 603. To this end, sufficient volume can be provided by the refrigerant circuit outside the evaporator passageways to ensure that the entire refrigerant charge can be held by the circuit and that the level of the liquid refrigerant in the circuit does not rise above the highest level of the tube from the evaporator outlet to the separator outlet. This can usually be accomplished without providing a liquid refrigerant reservoir—especially in cases where the levels of the condenser and separator liquid inlets are above the level of the evaporator.

An alternative method for preventing the refrigerant from exceeding its maximum design pressure, which also applies to any medium to be heated (whether it be a solid, liquid or gas), is to divert the refrigerant flow so that it by-passes condenser 608 in FIG. 6 and rejects to a heat sink a sufficient proportion of the radiant heat absorbed by evaporator 601 to prevent the pressure or temperature, or both, of the refrigerant from exceeding its maximum design operating limit. This heat sink will usually be water or the outdoors ambient air. In the case where the heat sink is air, the means used to transfer heat from the refrigerant to the air is any type of air cooled condenser; and, in the case where the heat sink is water, the means is any type of water cooled condenser. The water for the water sink can be, or come from, any natural or man-made supply, such as the sea, a lake, an artesian well, or water from the cold-water supply of a man-made water distribution system. The air and water condenser hereinafter referred to as "heat-rejection condensers", may use either natural air and natural water circulation, respectively, or forced air and forced water circulation, respectively.

The refrigerant flow can be directed from the condenser employed to transfer heat to the medium to be heated, hereinafter called the "heating condenser", to the heat-rejection condenser by any known means that diverts the flow of the refrigerant vapor from the inlet of the former condenser to the inlet of the latter condenser and any known means that prohibits the refrigerant flowing from the outlet of the latter condenser toward the outlet of the former condenser. The means for determining whether to divert the flow from the heating condenser to the heat-rejection condenser can be any of the means described earlier for controlling the valve or other mechanism for preventing refrigerant from entering the evaporator inlet.

A system employing a heat sink is shown in FIG. 7 and includes evaporator 701, separator 702, heating condenser 703, and heat-rejection condenser 704. It will be seen that the two condensers are connected in parallel. Condenser 704 need not be at the same level as condenser 703, but its outlet 714 must be at a sufficiently higher level than evaporator inlet 706 for gravity return. The refrigerant flow can be diverted from condenser 703 to condenser 704 by using a three-way valve at refrigerant line junction 707 or a two-way valve 709 between outlet 708 of condenser 703 and junction 710. However, it will in general, be sufficient to use a two-way valve 711 between junction 707 and inlet 712 to condenser 704 instead of the a diverting valve. In applications where, under normal operating conditions, the heating condenser is operated at a higher temperature than the heat rejection condenser, a unidirectional valve 713 between outlet 714 of condenser 704 and junction 710 so oriented as to prevent loss of heat by refrigerant flow from point 710 toward point 714 should also be used in conjunction with the two-way valves 709 and 711. Valve 711 and valve 709 would be normally closed and open, respectively, and would open and close only when the refrigerant pressure or temperature exceeded its normal operating design value.

Alternatively, in the special case where the medium to be heated is water, (for example, water in a hot-water storage tank), cold water instead of water from the hot-water storage tank can be supplied to the "water side" of the heating condenser. The cold water may be obtained from any natural or man-made supply and pumped through the heating condenser. In the particular case where the water supply is a pressurized water mains supply, no water pump is needed if the level of the condenser is low enough for the water pressure to cause adequate flow through the condenser. If either the water pressure is inadequate or if one wishes to allow for pump failure or water mains cut-off, a cold water tank above the condenser can be provided which is filled with water and from which water can be supplied to the water-side of the heating condenser by gravity and circulated by the thermosiphon effect or dumped.

A system is illustrated in FIG. 8 where the mains (cold water) supply has sufficient pressure to cause adequate flow through the heating condenser 801 and the cold water from the mains is "dumped" after passing through the heating condenser. During the normal operating mode, and while no water is being drawn from the hot-water storage tank 808, pump 802 circulates, whenever necessary, water between (hot-water) storage tank 808 and condenser 801 to offset the heat losses of the storage tank to its surroundings and maintain it, insofar as possible, at the desired temperature. During the normal operating mode, water is drawn from the mains cold water supply 803 only whenever water is drawn from the hot water supply at 804, and pump 802 remains on.

However, if the refrigerant pressure or temperature exceeds its maximum design value—as determined, for example, by any of the means mentioned earlier in this specification—or if the water in the storage tank exceeds its maximum design temperature or water pump 802 is stopped, valve 805 opens and dumps at 806 water drawn from the cold water supply 803. Depending on the relative level of the various systems components, and on other system parameters (such as the pump design), it may be necessary or desirable to locate a check valve either between pump 802 and junction 807 or between cold water inlet 803 and junction 807 or both. Any known means can be used to control dumping valve 805.

In the case where the heating condenser is exposed to subfreezing temperatures (because for example, it is physically integrated into a collector assembly mounted on a roof), precautions must be taken to prevent the water from freezing. In Rankine-type heat-transfer systems, the freezing problem is much less severe than in water systems without anti-freeze because the condenser and its associated outdoor water lines can be insulated. This means not only that the amount of heat required to stop the water from freezing is, under steady state conditions, much less than the amount required for a water-filled solar-collector system for a given number of degrees of frost, but also the elapsed time after the onset of frost is much greater before the water in the condenser would reach its freezing point. This means in particular, that in many installations where frost conditions are not severe, it is unnecessary either to use additional heating methods, such as an electrical heating element, or to circulate with a pump water from the hot-water storage tank through condenser 801 because thermosiphon circulation will suffice.

An alternative method is to circulate the main water as in the case of over-pressure or over-temperature protection discussed above. The flow rate required to prevent frost will be small enough so that one can afford to dump it using the same general arrangement as in the over-pressure or over-temperature case shown in FIG. 8. The dumping valve should, however, be required to open not when an upper limit of pressure or temperature is reached in the refrigerant, but when a low water temperature is reached, on the order between about 2° and 5° C., depending on the accuracy of the controlled system.

CLASS B EMBODIMENTS

As mentioned earlier under CLASSES OF EMBODIMENTS, Class B systems employ an evaporator with one outlet from which exits slightly superheated refrigerant vapor.

The superheat is measured and an active device is used to vary the mass flow rate of the refrigerant entering the evaporator to keep the superheat within preassigned limits, say between 2° and 5° C. This method of controlling this class of embodiments is described in my copending patent application, Ser. No. 457,271, at page 28, and the method of measuring superheat is illustrated in FIG. 7A of the application drawings.

The evaporators used with these systems resemble evaporators known to those skilled in the art as dry evaporators but differ from them in that they include at their inlet no pressure reducing device. Because dry evaporators require, for the same passageways internal volume, a much smaller refrigerant charge than flooded evaporators, they may be commercially useful in the case of planar collectors with a large passageways volume and low enough losses to the surroundings for a few degrees of superheat to have a negligible effect on collector efficiency. They may also be useful in decreasing the static head in evaporators with a large difference in elevation between their gas and liquid headers.

CLASS C EMBODIMENTS

As mentioned earlier, under CLASSES OF EMBODIMENTS, the state of the refrigerant at the outlet of the evaporator in Class C embodiments is wet vapor whose quality varies with operating conditions.

The basic fluid loop for Class C embodiments is shown in FIG. 9. The refrigerant enters evaporator 901 at 902 in the liquid state and exits at 903, in general, in the wet vapor state. This wet vapor enters separator 904 at point 905, and its vapor phase and its liquid phase exit this separator at 906 and 907, respectively. The vapor phase enters condenser 908 at 909 and the condensed vapor exits at 910 and combines with the liquid from exit 907 at 911. The combined liquid enters refrigerant reservoir 912 at 913, exits at 914 and is returned to evaporator inlet 902 by pump 915.

The fluid flow separator 904 in the fluid loop of Class C embodiments of my invention, differs from that of the separators employed in Class A embodiments of my invention. Separator 904 in the Class C system is used to return the excess liquid that is not vaporized in the evaporator to a point in the fluid circuit preceding the pump which serves to return the condensed vapor to the evaporator. In the Class A embodiments, the excess liquid is returned directly to the inlet of the evaporator.

In the special case where the separator 904 is located at a level near the top or vertically above the passageways of evaporator 901, the separator can also be used to return a portion of the excess liquid to the evaporator inlet using piping and check valve 916, as shown by the dotted lines in FIG. 9. This special configuration could sometimes be used to advantage compared to Class A embodiments when the pump employed to return the condensed vapor has a variable capacity within a range much narrower than the ideally desirable range of mass flow rates entering the evaporator.

A SPECIFIC EMBODIMENT OF CLASS C SYSTEMS

The quality of the wet vapor refrigerant exiting the evaporator is allowed to vary between just over zero and one, and thus permits, as will be explained below, a constant capacity and, in particular, a constant speed condensate pump to be employed. This type of system is in general less efficient than a Class A system, but may be more cost-effective for small installations, say with collectors up to 800 square feet, where the additional cost of providing means for varying the capacity of the pump, such as pump 915 in FIG. 9, by for example, changing its speed, may not justify the resulting increase in system efficiency.

In this embodiment, as shown in FIG. 10, the refrigerant enters at 1001, in the liquid phase, the lower header 1002 of evaporator 1003. In the evaporator, the refrigerant absorbs heat primarily by evaporation and exits at 1004, in general partly in the liquid phase and partly in the vapor phase, from upper head 1005 of the evaporator. After leaving the upper header, the refrigerant enters separator 1006 at 1007. The part of the refrigerant in the vapor phase exits the separator at 1008 and enters condenser 1009 at 1010. The condensed refrigerant vapor leaves the condenser at 1011 and is joined at 1012 by the part of the refrigerant which exits, in the liquid phase, from the separator at 1013. The resulting liquid refrigerant from both parallel paths enters the refrigerant reservoir 1014 at 1015 and exits at 1016. After passing through the filter-dryer 1017 and, preferably, a refrigerant moisture indicator 1018, the liquid refrigerant then goes to a constant-speed refrigerant pump 1019 which returns the refrigerant to the lower collector header at 1001.

The medium to be heated, for example, water stored in a heat reservoir, or, for specific example, a home hot water storage tank, is circulated by a water pump (not shown in FIG. 10) through condenser 1009. The water enters the condenser at 1020 and exits at 1021 after absorbing the latent heat released by condensation by the refrigerant as it flows through the condenser.

The capacity of the constant-speed refrigerant pump 1019 employed by this particular Rankine-type configuration of my invention, is chosen to produce the particular flow rate that causes all the refrigerant leaving the evaporator passageways to be in the saturated vapor state at the collector's designed maximum net heat-absorption rate. Whenever the collector net heat absorption rate is less than this maximum value, a portion of the refrigerant leaving the collector is necessarily in the liquid phase and that portion increases as the collector net heat absorption rate decreases until only refrigerant in the liquid phase leaves the evaporator passageways when the collector net heat-absorption rate becomes zero. In practice, it is preferred that the controls stop the system before this heat-absorption rate does become zero.

The purpose of the controls is:
(a) to start the foregoing heat-transfer cycle whenever the net heat-absorption rate (namely, whenever the net thermal energy absorbed by the collector) exceeds by a preselected amount the electrical power consumed by the refrigerant pump and the water pump; and (b) to stop the foregoing heat-transfer cycle whenever the net heat-absorption-rate of the collector falls below a preselected value above the electrical power consumed by the foregoing two pumps, which value is less than the amount selected starting the heat-transfer cycle.

Known techniques exist for estimating the net heat-absorption-rate of a solar collector. However, in the particular Rankine-type configuration discussed here, this rate can be easily estimated for the purpose of designing a practical system in accordance with this form of the invention by measuring the difference between the temperature at the top of the collector (say of the refrigerant in the upper header 1005) and the temperature near the bottom of the heat reservoir or home water storage tank (not shown in FIG. 10). Thus, the control system employed to start and stop this particular Rankine-type cycle is identical to that used in a conventional single-phase liquid system and, in particular, a water system. Furthermore, essentially no additional controls are required to control this particular Rankine-type configuration during operation. The only additional control which may be desirable in this configuration, and which may also be desirable in a conventional liquid system—especially if it is a large system—is the lower limit switch, indicated as 1025 in FIG. 10. This switch is used to stop the refrigerant pump 1019 if the level of liquid refrigerant in reservoir 1014 falls below a preselected minimum level. This switch thus protects the refrigerant pump from running dry. This could happen under certain transient operating conditions or, during steady-state conditions, if the amount of refrigerant charge is inadequate.

The method of charging the system with refrigerant is identical with that used for charging a conventional refrigeration system. Access valve 1023 is provided for first evacuating and then charging the system.

This Rankine-type system is also self-protecting in the event of a power supply failure and also for most equipment failures. With insolation present, but with the refrigerant pump not operating, all the refrigerant in the collector absorber will collect by the action of gravity and the process of vapor migration into the liquid piping, the liquid refrigerant reservoir, the condenser and the vapor piping. While the refrigerant is evaporating from the collector absorber and condensing in other parts of the system, the temperature of the collector absorber is held close to the condensation temperature until "starvation" commences and the exiting vapor becomes superheated. At this time, the temperature of the collector absorber will rise; but the vapor pressure remains close to that of the condensation temperature at all times, and will be below the maximum operating pressure even when there is no liquid refrigerant left in the collector absorber. The stagnation pressure in the collector, after steady-state conditions have been reached, is the saturated-vapor pressure corresponding to the temperature in the building at the vapor-liquid interface in the piping, and is therefore lower than the pressure in the collector absorber during operation when the temperature of this absorber is above that of the temperature in the building. Nevertheless, safety pressure-relief valve 1022 is provided, for example, near evaporator upper header 1005, to protect the system should either the system be so greatly overcharged that there is insufficient space in the piping and equipment below the top of the collector lower header to hold the entire liquid refrigerant charge, or a blockage occurs in the system such that liquid refrigerant is trapped in the collector.

MODIFICATIONS, VARIATIONS AND ADDITIONAL DISCUSSION

It should be apparent to those skilled in the art that in the absence of a refrigerant pump there is no distinction between the fluid circuit configuration of the Class A systems and the circuit configuration of the Class C systems. However, the gravity system is a Class A system because the refrigerant flow through the evaporator changes with the rate at which heat is absorbed by the refrigerant in the evaporator passageways.

Further, a very significant advantage of my invention as pertains to all classes when utilizing a refrigerant of the "Freon" type, or other halogenated compounds containing fluorine, is that all of the refrigerant circuit components, including the absorber or solar collector, piping, etc., may be constructed of aluminum and thus avoid the rusting and pH control problems which plague water and copper or steel. This advantage represents a major benefit in the overall cost and maintenance of the heating system.

In a Class A system utilizing a variable capacity pump, it is possible to connect the liquid refrigerant exit line from the separator to a point in the refrigerant circuit in advance of the circulating pump, and after the condenser, instead of connecting the line to the evaporator inlet, or in advance of the pump. While such a modification is contemplated within the scope of my invention, it is not economically preferred under present technology and anticipated applications.

It will also be apparent to those skilled in the art that the protection mechanisms shown in FIGS. 7 and 8, and their associated description in this specification, are equally applicable to all type systems, whether Class A, Class B or Class C.

It will also be apparent to those skilled in the art that a liquid refrigerant reservoir is not strictly necessary in any of the Class A, Class B or Class C systems disclosed above. In particular, proportional liquid level sensors and liquid level switches can be operated by the liquid level in a non-horizontal tube and do not need a liquid reservoir. On the other hand, the use of such a reservoir may help reduce the requirements to be met by such sensors, for example, a reservoir reduces the required speed of response of these sensors to changes of liquid level. A liquid refrigerant reservoir may also be useful to allow for changes in the amount of liquid refrigerant contained in the absorber evaporator under different heat absorption rates. It may also be useful in providing large tolerances for deviations of the system refrigerant charge from the correct charge, or to allow the same refrigerant charge to be used with different lengths of liquid lines between the evaporators in the collector and the heat transfer unit containing, say, the condenser and refrigerant pump.

The liquid refrigerant reservoir may be connected to the liquid lines between the separator and condenser on the one hand and the refrigerant pump on the other in a number of ways. The preferred arrangement depends on many factors, including (a) the type of refrigerant pump used;

(b) whether the heat transfer unit is to be precharged and connected to an uncharged evaporator (or collector); and (c) the amount and shape of the available space in the heat transfer unit cabinet. Other examples of typical arrangements are shown in FIGS. 13A and 13B. In both arrangements, 1301 designates the separator, 1302 the condensor and 1303 the refrigerant reservoir. Point 1304 is connected, in essence, to the absorber inlet in natural refrigerant circulation systems and to the refrigerant pump in forced-circulation refrigerant systems. The refrigerant line between 1305 and 1306 is an equalizer whose function is described on pages 26-8 and 26-9 of the 1976 Systems ASHRAE Handbook and Product Directory. Whether or not an equalizer line is required in any system depends upon considerations described also on pages 26-8 and 26-9 of the 1976 Systems ASHRAE Handbook and Product Directory.

Any refrigerant pump used should be sealless. Within that broad group of pumps, a number of different pumps can be used. Some of these can be damaged if they are used to pump a mixture of liquid and vapor, or worse, vapor alone, for less than one minute. Others, at the other extreme, can pump vapor for many hours without being damaged. In principle, a forced flow circulation system can be designed so that the pump used is always supplied with the minimum required liquid head. However, in practice, a deficiency in refrigerant charge may occur that results in this minimum head not being available, and in the pump being damaged. It may, therefore, be desirable—especially in larger systems—to provide a low-level switch which stops the pump if the liquid level in the line preceding the pump, or in the liquid refrigerant reservoir (if one is used), falls below a preselected level.

Further, it will be apparent to those skilled in the art that numerous modifications and variations to the systems I have described are possible without departing from the scope of my invention. Accordingly, it is intended that the embodiments disclosed are for illustrative purposes only and the scope of my invention is to be defined by the appended claims.

What is claimed is:

1. An improved heating system for collecting radiant energy, and absorbing heat from a source of radiant energy, and for transferring the absorbed heat to a substance, of the type having a refrigerant and a principal refrigerant circuit within which the refrigerant is circulated by the net static head, in the principal refrigerant circuit, resulting solely from the source of radiant energy and the local gravitational field, which includes:
    (a) means for absorbing heat from the source of radiant energy, and for evaporating at least a portion of the liquid refrigerant entering said absorbing means, said absorbing means having one or more inlets, one or more outlets, and one or more refrigerant passageways connecting said one or more inlets of said absorbing means to said one or more outlets of said absorbing means;
    (b) means, having a refrigerant passage and a condensing surface, for condensing essentially all the evaporated portion of the refrigerant exiting said absorbing means and transferring the heat from the refrigerant to the substance, said condensing means having a refrigerant inlet and a refrigerant outlet;
    (c) means for transferring the refrigerant evaporated in said absorbing means to said condensing means; and
    (d) means for returning liquid refrigerant from said condensing means to said absorbing means;
wherein the improvement comprises:
    (a) means for separating the evaporated portion from the non-evaporated portion of the refrigerant exiting said absorbing means, for transferring the evaporated portion of the refrigerant to said condensing means, and for returning the non-evaporated portion of said refrigerant to said one or more inlets of said absorbing means; and
    (b) means for reducing, including stopping, the flow of liquid refrigerant into all said one or more inlets of said absorbing means whenever the pressure of the refrigerant, at a selected location, including the location of said flow-reducing means, exceeds a preselected value.

2. A heating system, in accordance with claim 1 wherein said separating means is of the type having at least three refrigerant ports, including one or more vapor inlets connected to said one or more outlets of said absorbing means, a liquid outlet connected to the principal refrigerant circuit at a mergence point located between the refrigerant outlet of said condensing means and said one or more inlets of said absorbing means, and a vapor outlet connected to the refrigerant inlet of said condensing means, delivering substantially only dry vapor to the refrigerant inlet of said condensing means; wherein said flow-reducing means has an inlet connected to the mergence point, and an outlet connected to all said one or more inlets of said absorbing means; and wherein the refrigerant is circulated in an auxiliary refrigerant circuit—which includes said absorbing means, all the said one or more vapor inlets of said separating means, the liquid outlet of said separating means, and the mergence point, and the inlet and outlet of said flow-reducing means, and excludes the refrigerant inlet and outlet of said condensing means—by the net static head, in the auxiliary refrigerant circuit, resulting solely from the combined action of the heat absorbed from the source of radiant energy and the local gravitational field.

3. A heating system, in accordance with claim 1, wherein said separating means is of the type having at least four ports, including one or more vapor inlets connected to said one or more outlets of said absorbing means, a liquid outlet, a vapor outlet connected to the refrigerant inlet of said condensing means delivering substantially only dry vapor to said condensing means, and a liquid inlet connected to the refrigerant outlet of said condensing means for returning condensed liquid to said separating means; wherein said flow-reducing means has an inlet connected to the liquid outlet of said separating means, and an outlet connected to all said one or more inlets of said absorbing means; and wherein the refrigerant is circulated in an auxiliary refrigerant circuit—which includes said absorbing means, all said one or more vapor inlets and the liquid outlet of said separating means, and said flow-reducing means, and excludes said condensing means—by the net static head, in the auxiliary refrigerant circuit, resulting solely from the combined action of the heat absorbed from the source of radiant energy and the local gravitational field.

4. A heating system, in accordance with claim 2, wherein the mergence point is, under all operating conditions, sealed with liquid refrigerant, thereby preventing sewer-type flow between the mergence point and the refrigerant outlet of said condensing means.

5. A heating system, in accordance with claim 3, wherein the liquid inlet of said separating means is, under all operating conditions, located below the surface of the liquid refrigerant in said separating means, thereby preventing sewer-type flow between the liquid inlet of said separating means and the refrigerant outlet of said condensing means.

6. A heating system, in accordance with claim 1, 2, or 3, wherein the flow-reducing means is controlled by refrigerant pressure so that the flow-reducing means, with increasing refrigerant pressure, starts to close when the refrigerant pressure, at the selected location, rises above the preselected value of refrigerant pressure, and so that the flow-reducing means, with decreasing refrigerant pressure, starts to open when the refrigerant pressure, at the selected location, falls below a lower value of refrigerant pressure than the preselected value of refrigerant pressure.

7. A heating system, in accordance with claim 1, 2, or 3, wherein the flow-reducing means is controlled by refrigerant temperature so that the flow reducing means, with increasing refrigerant temperature, starts to close when the refrigerant temperature, at the preselected location, rises above the value of the refrigerant saturation temperature corresponding to the preselected value of refrigerant pressure, and so that the flow-reducing means, with decreasing refrigerant temperature, starts to open when the refrigerant temperature, at the selected location, falls below a lower value of refrigerant temperature than the value of the refrigerant saturation temperature corresponding to the preselected value of refrigerant pressure.

8. A heating system, in accordance with claim 1, wherein said separating means is large enough to accommodate the maximum volume of liquid refrigerant displaced from said absorbing means at high refrigerant evaporation rates in said absorbing means without impairing the separation function of said separating means.

9. A heating system, in accordance with claim 1, 2, or 3, wherein the absorbing means is tilted with respect to a local horizontal plane so that the one or more outlets of said absorbing means are above the one or more inlets of said absorbing means; and wherein all the one or more liquid outlets of said separating means are located at or above the lowest common level attained by the surfaces of the liquid refrigerant—within the range of operating temperatures over which the system is designed to operate—when no radiant energy is being absorbed by the system, and the temperature of all said surfaces are equal.

10. A heating system, in accordance with claim 1, wherein the substance is a fluid, and which also includes means for circulating the fluid substance through said condensing means.

11. An improved heating system for absorbing heat from solar radiant energy, and for transferring the absorbed heat to a substance, of the type having a refrigerant and a principal refrigerant circuit within which the refrigerant is circulated by the net static head, in the principal refrigerant circuit, resulting solely from the radiant energy and the local gravitational field, which includes:
(a) means for absorbing heat from the radiant energy, and for evaporating at least a portion of the liquid refrigerant entering said absorbing means, said absorbing means having one or more inlets, one or more outlets, and one or more refrigerant passageways connecting said one or more inlets of said absorbing means to said one or more outlets of said absorbing means;
(b) means, having a refrigerant passage and a condensing surface, for condensing essentially all the evaporated portion of the refrigerant exiting said absorbing means and transferring the heat from the refrigerant to the substance, said condensing means having a refrigerant inlet and a refrigerant outlet;
(c) means for transferring the refrigerant vapor exiting said absorbing means to said condensing means; and
(d) means for returning liquid refrigerant from said condensing means to said absorbing means;
wherein the improvement comprises means for separating the evaporated portion and the non-evaporated portion of the refrigerant exiting said absorbing means, for transferring the evaporated portion of the refrigerant to said condensing means, and for returning the non-evaporated portion to said absorbing means; and wherein the separating means is located spatially with respect to said absorbing means, and is sized and shaped, so that there exists at least one value of refrigerant charge for which—for all useful refrigerant evaporation rates at a preselected evaporation temperature—
(a) the refrigerant vapor exiting said absorbing means is not superheated significantly, and
(b) the refrigerant vapor exiting said separating means is substantially dry.

12. An improved heating system for absorbing heat from solar radiant energy, and for transferring the absorbed heat to a substance of the type having a refrigerant and a principal refrigerant circuit within which the refrigerant is circulated by the net static head, in the principal refrigerant circuit, resulting solely from the radiant energy and the local gravitational field, which includes:
(a) means for absorbing heat from the radiant energy, and for evaporating at least a portion of the liquid refrigerant entering said absorbing means, said absorbing means having one or more inlets, one or more outlets, and one or more refrigerant passageways connecting said one or more inlets of said absorbing means to said one or more outlets of said absorbing means;
(b) means, having a refrigerant passage, and a condensing surface, for condensing essentially all the evaporated portion of the refrigerant exiting said absorbing means and transferring the heat from the refrigerant to the substance, said condensing means having a refrigerant inlet and a refrigerant outlet;
(c) means for transferring the refrigerant vapor exiting said absorbing means to said condensing means; and
(d) means for returning liquid refrigerant from said condensing means to said absorbing means;
wherein the improvement comprises means for separating the evaporated portion of the refrigerant exiting said absorbing means, for storing the maximum volume of liquid refrigerant displaced from said absorbing means at high evaporation rates, for transferring the evaporated portion of the refrigerant to said condensing means, and for returning the non-evaporated portion to said absorbing means; and wherein said condensing means is located spatially with respect to said absorbing means, and said separating means is located spatially with respect to said absorbing means and said condensing means and is sized and shaped, so that there exists at least one value of refrigerant charge for which—for all useful evaporation rates at a preselected evaporation temperature—

(a) the refrigerant vapor exiting said absorbing means is not superheated significantly, (b) the refrigerant vapor exiting said separating means is substantially dry, and (c) the effective condensing area of the condensing surface of said condensing means is not reduced significantly be being immersed in or flooded by, liquid refrigerant.

13. An improved heating system for absorbing heat from a source of radiant energy, and for transferring the absorbed heat to a substance, of the type having a refrigerant and a principal refrigerant circuit within which the refrigerant is circulated by the net static head, in the principal refrigerant circuit, resulting solely from the source of radiant energy and the local gravitational field, which includes:

(a) means for absorbing heat from the source of radiant energy, and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means, having a refrigerant passage and a condensing surface, for condensing essentially all the evaporated portion of the refrigerant exiting said absorbing means and transferring the heat from the refrigerant to the substance, said condensing means having a refrigerant inlet and a refrigerant outlet;

(c) means for transferring the refrigerant vapor exiting said absorbing means to said condensing means; and (d) means for returning liquid refrigerant from said condensing means to said absorbing means;

wherein the improvement comprises means for separating the evaporated portion and the non-evaporated portion of the refrigerant exiting said absorbing means, for transferring the evaporated portion of the refrigerant to said condensing means, for returning the non-evaporated portion of said refrigerant to said absorbing means; and wherein the highest level of the surface of the liquid refrigerant, in said separating means, attained at high evaporation rates, is located at a level no lower than the highest part of the one or more refrigerant passageways of said absorbing means exposed to radiant energy from the source of radiant energy.

14. An improved heating system for absorbing heat from a source of radiant energy, and for transferring the absorbed heat to a substance, of the type having a refrigerant and a principal refrigerant circuit within which the refrigerant is circulated by the net static head, in the principal refrigerant circuit, resulting solely from the source of radiant energy and the local gravitational field, which includes:

(a) means for absorbing heat from the source of radiant energy, and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means, said absorbing means being tilted with respect to a local horizontal plane so that the one or more outlets are above the one or more inlets:

(b) means, having a refrigerant passage and a condensing surface, for condensing essentially all the evaporated portion of the refrigerant exiting said absorbing means and transferring the heat from the refrigerant to the substance, said condensing means having a refrigerant inlet and a refrigerant outlet;

(c) means for transferring the refrigerant vapor exiting said absorbing means to said condensing means; and (d) means for returning liquid refrigerant from said condensing means to said absorbing means;

wherein the improvement comprises means, having one or more liquid outlets, for separating the evaporated portion and the non-evaporated portion of the refrigerant exiting said absorbing means, for transferring the evaporated portion of the refrigerant to said condensing means, and for returning the non-evaporated portion to said absorbing means; and wherein at least one of the one or more liquid outlets of said separating means is at or above the lowest common level attained by the surfaces of the liquid refrigerant—within the range of operating temperatures over which the system is designed to operate—when no radiant energy is being adsorbed by the system, and the temperature of all said surfaces are equal.

15. A heating system in accordance with claim 11, 12, 13, or 14, which also includes means for collecting radiant energy from the source of radiant energy and concentrating said radiant energy on said absorbing means.

16. A heating system, in accordance with claim 11, 12, or 13, wherein said separating means is of the type having at least three refrigerant ports, including one or more vapor inlets connected to said one or more outlets of said absorbing means, a liquid outlet connected to the principal refrigerant circuit at a mergence point located between the refrigerant outlet of said condensing means and the one or more inlets of said absorbing means, and a vapor outlet connected to the refrigerant inlet of said condensing means for delivering substantially only dry vapor to the refrigerant inlet of said condensing means; and wherein the refrigerant is circulated in an auxiliary refrigerant circuit—which includes said absorbing means, all the one or more vapor inlets and the liquid outlet of said separating means, and the mergence point, and which excludes said condensing means—by the net static head, in the auxiliary refrigerant circuit, resulting solely from the combined action of the heat absorbed from the source of radiant energy and the local gravitational field.

17. A heating system, in accordance with claim 11, 12, or 13, wherein said separating means is of the type having at least four refrigerant ports, including one or more vapor inlets connected to the one or more vapor outlets of said absorbing means, one or more liquid outlets connected to the one or more inlets of said absorbing means, one or more vapor outlets connected to the refrigerant inlet of said condensing means, and one or more liquid inlets connected to the refrigerant outlet of said condensing means; and wherein the refrigerant is circulated in an auxiliary refrigerant circuit—which includes all the one or more inlets and all the one or more outlets of said absorbing means, all the one or more vapor inlets and all the one or more liquid outlets of said separating means, and excludes all the one or more refrigerant vapor outlets and all the one or more refrigerant liquid inlets of said separating means, and the refrigerant inlet and the refrigerant outlet of said condensing means—by the net static head, in the auxiliary refrigerant circuit, resulting solely from the combined action of the heat absorbed from the source of radiant energy and the local gravitational field.

18. A heating system, in accordance with claim 11 or 12, wherein the refrigerant vapor exiting said absorbing means is maintained, at the maximum achievable evaporation rate at the preselected evaporation temperature, at a quality less than a preselected useful value.

19. An improved heating system, located in the gravitational field of the earth, for collecting radiant energy emanating from a source of radiant energy, for absorbing heat from the collected radiant energy, and for transferring the absorbed heat to a substance, of the type having a refrigerant and a principal refrigerant circuit—within which the refrigerant is circulated by the net static head, in the principal refrigerant circuit, resulting solely from the action of the absorbed heat and the earth's gravitational field—which includes:
  (a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;
  (b) means for condensing essentially all the evaporated portion of the refrigerant exiting said absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;
  (c) means for transferring evaporated refrigerant from said absorbing means to said condensing means; and
  (d) means for returniing liquid refrigerant from said condensing means to said absorbing means;
wherein the improvement comprises means for reducing, including stopping, the flow of liquid refrigerant into all the one or more inlets of said absorbing means whenever the pressure of the refrigerant at a selected location, including the location of said flow-reducing means, exceeds a preselected value.

20. A heating system, in accordance with claim 19, wherein the improvement also comprises means for separating the evaporated portion from the non-evaporated portion of the refrigerant exiting said absorbing means, for transferring the evaporated portion of the refrigerant to said condensing means, and for returning the non-evaporated portion of the refrigerant to said absorbing means.

21. A heating system, in accordance with claim 20, wherein said separating means is of the type having one or more refrigerant ports connected to the one or more outlets of said absorbing means, and a vapor outlet connected to the refrigerant inlet of said condensing means, wherein refrigerant from said absorbing means enters said separating means through said one or more ports; wherein the evaporated portion of the refrigerant entering said separating means exits said separating means through the vapor outlet of said separating means and is transferred to said condensing means; wherein the non-evaporated portion of the refrigerant entering said separating means is returned to the one or more refrigerant passageways of said absorbing means through the one or more ports of said separating means and through the one or more outlets of said absorbing means by the action of the local gravitational field; and wherein the flow-reducing means has an inlet connected to the refrigerant outlet of said condensing means, and an outlet connected to all the one or more inlets of said absorbing means.

22. A heating system, in accordance with claim 20, which also includes a refrigerant pump having an inlet and an outlet, wherein said separating means is of the type having at least three refrigerant ports, including one or more vapor inlets connected to the one or more outlets of said absorbing means, a liquid outlet connected to the inlet of the refrigerant pump, and a vapor outlet connected to the refrigerant inlet of said condensing means, delivering substantially only dry vapor to the refrigerant inlet of said condensing means; wherein the outlet of the refrigerant pump is connected to the principal refrigerant circuit at a mergence point located between the refrigerant outlet of said condensing means and the one or more inlets of said absorbing means; wherein said flow-reducing means has an inlet connected to the mergence point and an outlet connected to the one or more inlets of said absorbing means; and wherein the refrigerant is circulated in an auxiliary refrigerant circuit—which includes said absorbing means, the one or more vapor outlets of said absorbing means, the one or more vapor inlets of said separating means, the liquid outlet of said separating means, the refrigerant pump, the mergence point, and said flow-reducing means—primarily by the action of the refrigerant pump.

23. A heating system, in accordance with claim 22, wherein the refrigerant pump is a positive displacement pump.

24. A heating system, in accordance with claim 22 or 23, which also includes means for varying the effective volumetric capacity of the refrigerant pump as a function, including a single-step function, of the level of liquid refrigerant in said separating means so that the effective capacity of the refrigerant pump is zero whenever said liquid level is below a first preselected level and a maximum whenever said liquid level is at or above a second preselected level at or higher than the first preselected level; and wherein said means for varying the effective volumetric capacity of the refrigerant pump includes varying the speed of the refrigerant pump.

25. A heating system, in accordance with claim 19, 20, 21, or 22, wherein the flow-reducing means is controlled by refrigerant pressure so that the flow-reducing means, with increasing refrigerant pressure, starts to close when the refrigerant pressure, at the selected location, rises above the preselected value of refrigerant pressure, and so that the flow-reducing means, with decreasing refrigerant pressure, starts to open when the refrigerant pressure, at the selected location, falls below a lower value of refrigerant pressure than the preselected value of refrigerant pressure.

26. A heating system, in accordance with claim 19, 20, 21, or 22, wherein the flow-reducing means is controlled by refrigerant temperature so that the flow-reducing means, with increasing refrigerant temperature, starts to close when the refrigerant temperature, at the preselected location, rises above the value of the refrigerant saturation temperature corresponding to the preselected value of refrigerant pressure, and so that the flow-reducing means, with decreasing refrigerant temperature, starts to open when the refrigerant temperature, at the selected location, falls below a lower value of refrigerant temperature than the value of the refrigerant saturation temperature corresponding to the preselected value of refrigerant pressure.

27. A heating system, in accordance with claim 19, or 18, wherein the improvement also comprises means, having one or more refrigerant passages, for rejecting heat from the refrigerant to a heat sink whenever the temperature of the refrigerant, at a selected location, exceeds a preselected value higher than the value of the saturation temperature of the refrigerant corresponding to the preselected value of the refrigerant pressure.

28. A heating system, in accordance with claim 27, wherein the heat-rejecting means includes means for preventing the flow of refrigerant through the one or more refrigerant passages of said heat-rejecting means.

29. A heating system, in accordance with claim 27, wherein the heat sink is primarily the outdoor ambient air in the vicinity of said absorbing means.

30. An improved heating system, located in the gravitational field of the earth, for collecting radiant energy from a source of radiant energy, for absorbing heat from the collected radiant energy, and for transferring the absorbed heat to a substance, of the type having a refrigerant and a principal refrigerant circuit—within which the refrigerant is circulated by the net static head, in the principal refrigerant circuit, resulting solely from the action of the absorbed heat and the earth's gravitational field—which includes:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting said absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;

(c) means for transferring refrigerant vapor from said absorbing means to said condensing means; and (d) means for returning liquid refrigerant from said condensing means to said absorbing means;

wherein the improvement comprises means for rejecting heat from the refrigerant to a heat sink whenever the temperature of the refrigerant, at a selected location, exceeds a preselected value.

31. A heating system, in accordance with claim 30, wherein the heat-rejecting means has an inlet connected to the principal refrigerant circuit at a branch point located in a refrigerant space, including a refrigerant passage, of said means for transferring refrigerant vapor from the one or more outlets of said absorbing means to the refrigerant inlet of said condensing means, and an outlet connected to the principal refrigerant circuit at a first mergence point located in a refrigerant space, including a refrigerant passage, of said means for returning liquid refrigerant from the refrigerant outlet of said condensing means to the one or more inlets of said absorbing means; and wherein the refrigerant is circulated in an auxiliary refrigerant heat-rejecting circuit—which includes the absorbing means, the branch point, the heat-rejecting means, and the first mergence point—by the net static head, in the auxiliary refrigerant heat-rejecting circuit, resulting solely from the combined action of the heat absorbed from the source of radiant energy and the earth's gravitational field.

32. A heating system, in accordance with claim 31, wherein the improvement also comprises means for separating the evaporated portion from the non-evaporated portion of the refrigerant exiting said absorbing means, for transferring the evaporated portion of the refrigerant to said condensing means, and for returning the non-evaporated portion of the refrigerant to said absorbing means.

33. A heating system in accordance with claim 32, wherein said separating means is of the type having one or more refrigerant ports connected to the one or more outlets of said absorbing means and a vapor outlet connected to the refrigerant inlet of said condensing means, wherein refrigerant from said absorbing means enters said separating means through said one or more ports; wherein the evaporated portion of the refrigerant entering said separating means exits said separating means through the vapor outlet of said separating means and is transferred to said condensing means; wherein the non-evaporated portion of the refrigerant entering said separating means is returned to the one or more refrigerant passageways of said absorbing means through the one or more ports of said separating means and through the one or more outlets of said absorbing means by the action of the earth's gravitational field; and wherein the branch point is located between the vapor outlet of said separating means and the refrigerant inlet of said condensing means.

34. A heating system, in accordance with claim 32, wherein said separating means is of the type having at least three refrigerant ports, including one or more vapor inlets connected to the one or more outlets of said absorbing means, a liquid outlet connected to the principal refrigerant circuit at a second mergence point located between the refrigerant outlet of said condensing means and the one or more inlets of said absorbing means, and a vapor outlet connected to the refrigerant inlet of said condensing means, delivering substantially only dry vapor to the refrigerant inlet of said condensing means; and wherein the refrigerant is circulated in an auxiliary refrigerant liquid-separating circuit—which includes said absorbing means, the one or more vapor inlets of said separating means, the liquid outlet of said separating means, and the second mergence point, and excludes said condensing means and said heat-rejecting means—by the net static head, in the auxiliary refrigerant liquid-separating circuit, resulting solely from the combined action of the heat absorbed from the source of radiant energy and the earth's gravitational field.

35. A heating system, in accordance with claim 32, wherein said separating means is of the type having at least four ports, including one or more vapor inlets connected to the one or more outlets of said absorbing means, one or more liquid outlets, connected to the one or more inlets of said absorbing means, a vapor outlet connected to the refrigerant inlet of said condensing means delivering substantially only dry vapor to said condensing means, and a liquid inlet connected to the refrigerant outlet of said condensing means for returning condensed liquid to said separating means; and wherein the refrigerant is circulated in an auxiliary refrigerant liquid-separating circuit—which includes said absorbing means, the one or more vapor inlets and the one or more liquid outlets of said separating means, and excludes said condensing means and said heat-rejecting means—by the net static head, in the auxiliary refrigerant liquid-separating circuit, resulting solely from the combined action of the heat absorbed from the source of radiant energy and the earth's gravitational field.

36. A heating system, in accordance with claim 32, which also includes a refrigerant pump having an inlet and an outlet, wherein said separating means is of the type having at least three refrigerant ports, including one or more vapor inlets connected to the one or more outlets of said absorbing means, a liquid outlet connected to the inlet of the refrigerant pump, and a vapor outlet connected to the refrigerant inlet of said condensing means; wherein the outlet of the refrigerant pump is connected to the principal refrigerant circuit at a second mergence point located between the refrigerant outlet of said condensing means and the one or more inlets of said absorbing means; and wherein the refrigerant is circulated in an auxiliary refrigerant liquid-separating circuit—which includes said absorbing means, the one or more vapor inlets of said separating means, the liquid outlet of said separating means, the refrigerant pump, and the second mergence point, and excludes said condensing means and said heat-rejecting means—primarily by the action of the refrigerant pump.

37. A heating system, in accordance with claim 34, 35, or 36, wherein the branch point is located in a refrigerant vapor space, including a refrigerant vapor passage, of the principal refrigerant circuit in which the evaporated portion of the refrigerant exiting said absorbing means is separated from the non-evaporated portion of the refrigerant exiting said absorbing means.

38. A heating system, in accordance with claim 34, 35, or 36, wherein the branch point is located in a refrigerant vapor space, including a vapor passage, connecting the one or more outlets of said absorbing means to the one or more vapor inlets of said separating means.

39. A heating system, in accordance with claim 31, wherein said heat-rejecting means includes heat-exchanging means having one or more refrigerant inlets, one or more refrigerant outlets, and one or more refrigerant passages connecting the one or more refrigerant inlets of said heat-exchanging means to the one or more refrigerant outlets of said heat-exchanging means; and wherein at least a part of the heat released by the refrigerant in said heat-exchanging means is obtained by condensing at least a portion of the refrigerant vapor entering said heat-rejecting means.

40. A heating system, in accordance with claim 39, wherein the heat-rejecting means also includes means for preventing the flow of refrigerant through the one or more refrigerant passages of said heat exchanging means whenever the temperature of the refrigerant at the selected location falls below the preselected value of refrigerant temperature.

41. A heating system, in accordance with claim 40, wherein the flow-preventing means has a refrigerant passage and is controlled by refrigerant temperature so that the flow-preventing means, with increasing refrigerant temperature, starts to open when the value of refrigerant temperature, at the selected location, rises above the preselected value of refrigerant temperature, and so that the flow-preventing means, with decreasing refrigerant temperature, starts to close when the value of refrigerant temperature, at the selected location, falls below a lower value of refrigerant temperature than the preselected value of refrigerant temperature; and wherein the fluid passage of the flow-preventing means is connected in series with all the one or more refrigerant passages of said heat-exchanging means.

42. A heating system, in accordance with claim 39, wherein the primary heat sink is the outdoor ambient air in the vicinity of said absorbing means; and wherein said heat-exchanging means also has one or more heat-conducting surfaces placed in thermal contact with both the refrigerant and the ambient air whenever the temperature of the refrigerant, at the selected location, exceeds the preselected value of refrigerant temperature.

43. A heating system, in accordance with claim 40, wherein the primary heat sink is the outdoor ambient air in the vicinity of said absorbing means; and wherein said heat-exchanging means also has one or more heat conducting surfaces permanently in thermal contact with the refrigerant and the ambient air.

44. A heating system, in accordance with claim 39, wherein said heat-exchanging means also has a fluid inlet, a fluid outlet and one or more fluid passages connecting the fluid inlet of said heat-exchanging means to the fluid outlet of said heat-exchanging means; and wherein the heat sink is water which flows through and is heated in, including boiled in, the one or more fluid passages of said heat-exchanging means—whenever the temperature of the refrigerant, at the selected location, exceeds the preselected value of refrigerant temperature—by heat released by refrigerant flowing through the one or more refrigerant passages of said heat-exchanging means.

45. A heating system, in accordance with claim 44, which also includes a water storage tank having an inlet and an outlet, and a fluid circuit—which includes the inlet and outlet of the water storage tank and the fluid inlet and outlet of said heat-exchanging means—within which the water is circulated.

46. A heating system, in accordance with claim 45, wherein the water is circulated by the net static head resulting solely from the heat absorbed by the water in said heat-exchanging means and the earth's gravitational field.

47. A heating system, in accordance with claim 45, wherein the fluid circuit includes a water pump and the water is circulated in the fluid circuit primarily by the action of a pump.

48. A heating system, in accordance with claim 44, wherein the water flowing through the one or more fluid passages of said heat-exchanging means is supplied by a pressurized supply of water, including a water mains supply; and wherein the heated, including boiled water, exiting the one or more fluid passages of said heat-rejecting means is dumped at a selected dumping location.

49. A heating system, in accordance with claim 30, wherein the substance is water; wherein said condensing means has a liquid inlet, a liquid outlet, and one or more fluid passages connecting the liquid inlet of said condensing means to the liquid outlet of said condensing means; and wherein water from a pressurized water supply, including a water mains supply, flows through the one or more fluid passages of said condensing means whenever the temperature of the refrigerant, at the selected location, exceeds the preselected value of refrigerant temperature; and wherein the heated, including boiled, water exiting the one or more liquid passages of said condensing means is dumped at a selected location.

50. A heating system, in accordance with claim 31, wherein said heat-rejecting means also includes a fluid and
(a) first heat-exchanging means having
   (1) a refrigerant inlet, a refrigerant outlet, and one or more refrigerant passages connecting the refrigerant inlet of said first heat-exchanging means to the refrigerant outlet of said first heat-exchanging means, and
   (2) a fluid inlet, a fluid outlet, and one or more fluid passages, in thermal contact with the one or more refrigerant passages of said first heat-exchanging means, connecting the fluid inlet of said first heat-exchanging means to the fluid outlet of said first heat-exchanging means;
(b) a second heat-exchanging means having
   (1) a fluid inlet connected to the fluid outlet of said first heat-exchanging means, and one or more fluid passages connecting the fluid inlet of said second heat-exchanging means to the fluid outlet of said second heat-exchanging means, and
   (2) one or more heat-conducting surfaces in thermal contact with the one or more fluid passages of said first heat-exchanging means, and with the outdoor ambient air;
wherein the refrigerant inlet of said first heat-exchanging means is connected to the inlet of said heat-rejecting means, and the refrigerant outlet of said first heat-exchanging means is connected to the outlet of said heat-rejecting means; wherein the fluid absorbs heat from the refrigerant in said first heat-exchanging means, whenever the temperature of the refrigerant at the selected location exceeds the preselected value of refrigerant temperature, and releases the absorbed heat in said second heat-exchanging means; and wherein the released heat is rejected by said second heat-exchanging means to the outdoor ambient air.

51. A heating system, in accordance with claim 50, wherein the fluid is a refrigerant which absorbs heat, at least in part by evaporation, in said first heat-exchanging means, and releases the absorbed heat, at least in part by condensation, in said second heat-exchanging means.

52. An improved heating system, located in the gravitational field of the earth, for collecting solar radiant energy, and for transferring the absorbed heat to a substance, of the type having a refrigerant and a principal refrigerant circuit—within which the refrigerant is circulated by the net static head, in the principal refrigerant circuit, resulting solely from the absorbed heat and the earth's gravitation field—which includes:
(a) means for absorbing heat from the radiant energy and for evaporating at least a portion of the liquid refrigerant entering said absorbing means, said absorbing means having an inlet and an outlet, and one or more refrigerant passageways connecting the inlet of said absorbing means to the outlet of said absorbing means;
(b) means for condensing essentially all the evaporated portion of the refrigerant exiting said absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;
(c) means for transferring refrigerant vapor from said absorbing means to said condensing means; and
(d) means for returning liquid refrigerant from said condensing means to said absorbing means;
wherein the improvement comprises a refrigerant-circuit configuration wherein the principal refrigerant circuit also includes means for storing liquid refrigerant displaced from said absorbing means at high evaporation rates, said storing means having an inlet and an outlet not necessarily distinct, and said storing means being located in the principal refrigerant circuit so that the inlet of said storing means is connected to the refrigerant outlet of said condensing means, and the outlet of said storing means is connected to the inlet of said absorbing means; and wherein
(a) the vertical location of
   (1) said condensing means with respect to said absorbing means, and of
   (2) said storing means with respect to said absorbing means and with respect to said condensing means;
(b) the size and shape of said storing means, and
(c) the cross-sectional areas of the refrigerant passages of the principal refrigerant circuit—including the one or more refrigerant passageways of said absorbing means and the one or more refrigerant passages of said condensing means—
are chosen so that there exists at least one amount of refrigerant mass, with which the refrigerant-circuit configuration can be charged, for which—over the entire range of achievable and useful evaporation rates at a preselected evaporation temperature—
(a) the refrigerant vapor exiting said absorbing means is not superheated significantly,
(b) the effective area of the one or more condensing surfaces of said condensing means is not reduced significantly by flooding with liquid refrigerant displaced from said absorbing means at high evaporation rates; and
(c) the refrigerant vapor delivered to said condensing means is substantially dry.

53. A heating system in accordance with claim 52, which also includes means for separating the evaporated portion of the refrigerant from the non-evaporated portion of the refrigerant exiting said absorbing means, for transferring the evaporated portion of the refrigerant to said condensing means, and for returning the non-evaporated portion of the refrigerant to said absorbing means; thereby ensuring that substantially dry refrigerant vapor is supplied to said condensing means while allowing the quality of the refrigerant vapor exiting said absorbing means to be less than one.

54. A heating system, in accordance with claim 53, wherein at least a part of the non-evaporated portion of the refrigerant vapor exiting said absorbing means is returned, through the outlet of said absorbing means, to the one or more refrigerant passageways of said absorbing means solely by the action of the earth's gravitational field.

55. A heating system, in accordance with claim 53, wherein the non-evaporated portion of the refrigerant exiting said absorbing means is returned to the inlet of said absorbing means at least in part by the action of the earth's gravitational field.

56. A heating system, in accordance with claim 53, which also includes a refrigerant pump, wherein the non-evaporated portion of the refrigerant exiting said absorbing means is returned to the inlet of said absorbing means primarily by the action of the refrigerant pump.

57. A heating system in accordance with claim 19, 30, or 52, which also includes means for concentrating the radiant energy on at least a portion of said absorbing means.

58. A heating system, in accordance with claim 19, 30, or 52, which also includes a collecting means; wherein said collecting means forms a substantially rectangular box with a cover transparent to the radiant energy; and wherein one or more of said absorbing means are located inside the rectangular box.

59. A heating system, in accordance with claim 58 wherein the one or more said absorbing means are substantially planar.

60. A heating system, in accordance with claim 19, 30, or 52, which also includes a collecting means; wherein said collecting means forms a substantially rectangular box with no cover; and wherein one or more of said absorbing means are located inside the rectangular box.

61. A heating system, in accordance with claim 19, 30, or 52, which also includes a collecting means; wherein the collecting means forms a substantially rectangular box; and wherein one or more of said absorbing means and said condensing means are located inside the rectangular box.

62. A heating system in accordance with claim 19, 30, or 52, which also includes separating means; wherein said collecting means forms a substantially rectangular box; and wherein one or more of said absorbing means and said separating means are located inside the rectangular box.

63. A heating system, in accordance with claim 62, wherein said condensing means is also located inside the rectangular box.

64. A heating system, in accordance with claim 19, 30, or 52, which also includes a collecting means; wherein one or more of said collecting means and one or more of said absorbing means are incorporated into a single, physically-distinct assembly forming a collector module; wherein said heating system includes a plurality of collector modules; wherein each said collector module includes an inlet and an outlet; wherein the inlets of said collector modules are substantially at the same level and connected in parallel to a common inlet; and wherein the outlets of said collector modules are substantially at the same level and connected in parallel to a common outlet.

65. A heating system, in accordance with claim 19, 30, or 52, which also includes collecting means; wherein one or more of said collecting means and one or more of said absorbing means are incorporated into a single, physically-distinct assembly forming a collector module; wherein said heating system includes a plurality of collector modules; wherein two or more of said collector modules are connected so that the refrigerant flows through said collector modules in series; wherein each set of collector modules connected in series has a first collector module and a last condenser module.

66. A heating system, in accordance with claim 64, which includes a plurality of sets of collector modules connected in series; wherein each said first collector module has an inlet and each last collector module has an outlet; wherein the inlets of said first collector modules are substantially at the same level and connected in parallel to a common inlet; and wherein the outlets of said last collector modules are substantially at the same level and connected in parallel to a common outlet.

67. A heating system, in accordance with claim 19, wherein the improvement also comprises means for storing liquid refrigerant, said storing means having an inlet and an outlet not necessarily distinct; and wherein the inlet of said storing means is connected to the refrigerant outlet of said condensing means and the outlet of said storing means is connected to the inlet of said flow-reducing means.

68. A heating system, in accordance with claim 30, wherein the improvement also comprises means for storing liquid refrigerant, said storing means having an inlet and an outlet not necessarily distinct; and wherein the inlet of said storing means is connected to the refrigerant outlet of said condensing means and the outlet of said storing means is connected to the one or more inlets of said absorbing means.

69. A heating system, in accordance with claim 67, or 68, wherein said absorbing means is tilted with respect to a local horizontal plane so that the one or more outlets of said absorbing means are above the one or more inlets of said absorbing means, and wherein the inlet of said storing means is located at or above the lowest common level of thw surfaces of the liquid refrigerant—at refrigerant temperatures within the range of refrigerant temperatures over which the heating system is designed to operate—when no radiant energy is being absorbed by the system, and the temperature of all said surfaces are equal.

70. A heating system in accordance with claim 19 or 30, wherein the improvement also comprises storing means incorporated physically into the lower part of said condensing means and having the same outlet as the refrigerant outlet of said condensing means.

71. A heating system, in accordance with claim 2, which also includes means for storing liquid refrigerant, said storing means having an inlet and an outlet not necessarily distinct; wherein the inlet of said storing means is connected to the refrigerant outlet of said condensing means, and the outlet of said storing means is connected to the mergence point.

72. A heating system in accordance with claim 67, or 68, wherein said storing means is of the type known as a through-type receiver.

73. A heating system in accordance with claim 67 or 68, wherein said storing means is of the type known as surge-type receiver.

74. A heating system in accordance with claim 20 or 33, wherein said separating means is physically an integral part of said absorbing means.

75. A heating system, in accordance with claim 19, 30, or 52, wherein the substance is a fluid.

76. A heating system, in accordance with claim 75, wherein said condensing means also has heat-conducting surfaces in thermal contact with the one or more refrigerant passages of said condensing means; and wherein the fluid flows over the heat-conducting surfaces and absorbs heat from the refrigerant whenever heat can be absorbed from the refrigerant at a useful rate.

77. A heating system, in accordance with claim 75, wherein said heat-conducting surfaces are tubes and the fluid flows inside the tubes.

78. A heating system, in accordance with claim 75, wherein the fluid flow occurs only whenever heat can be absorbed from the refrigerant at a useful rate and the temperature of the fluid, at a selected location, is less than a preselected value.

79. A heating system, in accordance with claim 1 or 19, wherein the improvement also comprises a refrigerant circuit configuration capable—at least whenever the average refrigerant temperature inside the one or more passageways of said absorbing means is higher than the refrigerant saturation temperature corresponding to the preselected value of refrigerant pressure and whenever the flow-reducing means is closed—of storing the volume of the liquid phase of the entire refrigerant charge of said refrigerant in one or more refrigerant spaces, including one or more refrigerant passages, outside the one or more refrigerant passageways of said absorbing means; said spaces being located, and connected to the one or more outlets of said absorbing means, so that liquid refrigerant in said spaces is prevented from entering the one or more passageways of said absorbing means, through the one or more outlets of said absorbing means, solely by the action of said gravitational field.

80. A heating system, in accordance with claim 14, wherein said lowest common level is low enough, and the horizontal cross-sectional area of said separating means is large enough, for the highest level of the liquid refrigerant in said separating means—attained at the highest achievable evaporation rate over the entire range of operating temperatures—not to exceed the highest level of said absorbing means irradiated by radiant energy from the source of radiant energy.

81. A heating system, in accordance with claim 1, 2, 3, 19, 20, or 21, wherein the flow-reducing means is controlled by refrigerant pressure so that the flow-reducing means, with increasing refrigerant pressure, starts to close when the refrigerant pressure, at the selected location, rises above the preselected value of refrigerant pressure, and so that the flow-reducing means, with decreasing refrigerant pressure, starts to open when the refrigerant pressure, at the selected location, falls below a refrigerant pressure having a value between the preselected value of refrigerant pressure and the value of refrigerant pressure at which said flow-reducing means stops closing.

82. A heating system, in accordance with claim 1, 2, 3, 19, 20, or 21, wherein the flow-reducing means is controlled by refrigerant temperature so that the flow-reducing means, with increasing refrigerant temperature, starts to close when the refrigerant temperature, at the preselected location, rises above the value of the refrigerant saturation temperature corresponding to the preselected value of refrigerant pressure, and so that the flow-reducing means, with decreasing refrigerant temperature, starts to open when the refrigerant temperature, at the selected location falls below a refrigerant temperature having a value between the value of said refrigerant saturated temperature and the value of saturated refrigerant temperature at which said flow-reducing means stops closing.

83. An improved heating system, located in the gravitational field of the earth, for collecting radiant energy emanating from a source of radiant energy, for absorbing heat from the collected radiant energy, and for transferring the absorbed heat to a substance, of the type having one or more refrigerant circuits—within which a refrigerant is circulated, at least in part, by one or more refrigerant pumps—which include:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting and absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;

(c) means for transferring evaporated refrigerant from said absorbing means to said condensing means; and (d) means for returning liquid refrigerant from said condensing means to said absorbing means; wherein the one or more refrigerant circuits include one or more refrigerant spaces, including one or more refrigerant passages, having a total internal volume—outside the one or more passageways of said absorbing means and below the level at which liquid refrigerant can flow solely by the action of gravity into the one or more refrigerant passageways of said absorbing means from refrigerant spaces and passages outside said refrigerant passageways—smaller than the total volume of liquid refrigerant under at least some internal and external system design conditions; so that, under at least some system steady-state, non-operating, design conditions, liquid refrigerant is present in the one or more refrigerant passageways of said absorbing means; wherein the improvement comprises means for reducing, including stopping, the flow of liquid refrigerant into all the one or more inlets of said absorbing means whenever the pressure of the refrigerant, at a first selected location, including the location of said flow-reducing means exceeds a preselected value, including a value equal to the maximum refrigerant operating design pressure.

84. An improved heating system, located in the gravitational field of the earth, for collecting radiant energy emanating from a source of radiant energy, for absorbing heat from the collected radiant energy, and for transferring the absorbed heat to a substance, of the type having one or more refrigerant circuits—within which a refrigerant is circulated, at least in part, by one or more refrigerant pumps—which include:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting and absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means.

(c) means for transferring evaporated refrigerant from said absorbing means to said condensing means; and (d) means for returning liquid refrigerant from said condensing means to said absorbing means; wherein the one or more refrigerant circuits include one or more refrigerant spaces, including one or more refrigerant passages, having a total internal volume—outside the one or more passageways of said abosrbing means and below the level at which liquid refrigerant can flow solely by the action of gravity into the one or more refrigerant passageways of said absorbing means from refrigerant spaces and passages outside said refrigerant passageways—smaller than the total volume of liquid refrigerant under at least some internal and external system design conditions; so that, under at least some system steady-state, non-operating, design conditions, liquid refrigerant is present in the one or more refrigerant passageways of said absorbing means; and wherein the improvement comprises means for rejecting heat absorbed by the refrigerant to a heat sink whenever the temperature of the refrigerant, at a selected location, exceeds a preselected value, including a value equal to the maximum refrigerant operating design temperature.

85. A heating system, in accordance with claim 83, wherein the improvement also comprises means for rejecting heat from the refrigerant to a heat sink whenever the temperature of the refrigerant, at a second selected location which includes the first selected location, exceeds a preselected value higher than the value of the refrigerant saturation temperature corresponding to the preselected value of refrigerant pressure.

86. An improved heating system, located in the gravitation field of the earth, for collecting radiant energy emanating from a source of radiant energy, for absorbing heat from the collected radiant energy, and for transferring the absorbed heat to a substance, of the type having one or more refrigerant circuits—within which a refrigerant is circulated, at least in part, by one or more refrigerant pumps—which include:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting and absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;

(c) means for transferring evaporated refrigerant from said absorbing means to said condensing means; and (d) means for returning liquid refrigerant from said condensing means to said absorbing means; wherein the one or more refrigerant circuits include one or more refrigerant spaces, including one or more refrigerant passages, having a total internal volume—outside the one or more passageways of said absorbing means and below the level at which liquid refrigerant can flow solely by the action of gravity into the one or more refrigerant passageways of said absorbing means from refrigerant spaces and passages outside said refrigerant passageways—smaller than the total volume of liquid refrigerant under at least some internal and external system design conditions; so that, under at least some system steady-state, non-operating, design conditions, liquid refrigerant is present in the one or more refrigerant passageways of said absorbing means; wherein the improvement comprises means for rejecting heat absorbed by the refrigerant to a heat sink whenever the pressure of the refrigerant, at a selected location, exceeds a preselected value of refrigerant pressure, including a value equal to the maximum refrigerant operating design pressure.

87. A heating system, in accordance with claim 83, 84, or 86, having only a single refrigerant circuit and a single refrigerant pump.

88. A heating system, in accordance with claim 83, wherein the flow-reducing means is controlled by refrigerant pressure so that the flow-reducing means, with increasing refrigerant pressure, starts to close when the refrigerant pressure, at the selected location, rises above the preselected value of refrigerant pressure, and so that the flow-reducing means, with decreasing refrigerant pressure, starts to open when the refrigerant pressure, at the selected location, falls below a second preselected value of refrigerant pressure.

89. A heating system, in accordance with claim 83, wherein the flow-reducing means is controlled by refrigerant temperature so that the flow-reducing means, with increasing refrigerant temperature, starts to close when the refrigerant temperature, at the preselected location, rises above the value of the refrigerant saturation temperature corresponding to the preselected value of refrigerant pressure, and so that the flow-reducing means, with decreasing refrigerant temperature, starts to open when the refrigerant temperature, at the selected location, falls below a second preselected value of refrigerant temperature.

90. An improved heating system, located in the gravitational field of the earth, for collecting radiant energy from a source of radiant energy, for absorbing heat from the collected radiant energy, and for transferring the absorbed heat to a substance, of the type having a refrigerant and a principal refrigerant circuit—within which the refrigerant is circulated by the net statis head, in the principal refrigerant circuit, resulting solely from the action of the absorbed heat and the earth's gravitational field—which includes:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting said absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;

(c) means for transferring refrigerant vapor from said absorbing means to said condensing means; and (d) means for returning liquid refrigerant from said condensing means to said absorbing means; wherein the improvement comprises means for rejecting heat from the refrigerant to a heat sink whenever the pressure of the refrigerant, at a selected location, exceeds a preselected value.

91. A heating system, in accordance with claim 90, wherein the heat-rejecting means has an inlet connected to the principal refrigerant circuit at a branch point located in a refrigerant space, including a refrigerant passage, of said means for transferring refrigerant vapor from the one or more outlets of said absorbing means to the refrigerant inlet of said condensing means, and an outlet connected to the principal refrigerant circuit at a first mergence point located in a refrigerant sapce, including a refrigerant passage, of said means for returning liquid refrigerant from the refrigerant outlet of said condensing means to the one or more inlets of said absorbing means; and wherein the refrigerant is circulated in an auxiliary refrigerant heat-rejecting circuit—which includes the absorbing means, the branch point, the heat-rejecting means, and the first mergence point—by the net static head, in the auxiliary refrigerant heat-rejecting circuit, resulting solely from the combined action of the heat absorbed from the source of radiant energy and the earth's gravitational field.

92. A heating system, in accordance with claim 39, wherein the heat-rejecting means also includes means for preventing the flow of refrigerant through the one or more refrigerant passages of said heat exchanging means whenever the pressure of the refrigerant at the selected location falls below the preselected value of refrigerant pressure.

93. A heating system, in accorance with claim 92, wherein the flow-preventing means has a refrigerant passsage and is controlled by refrigerant pressure so that the flow-preventing means, with increasing refrigerant pressure, starts to open when the value of refrigerant pressure, at the selected location, rises above the preselected value of refrigerant pressure, and so that the flow-preventing means, with decreasing refrigerant pressure, starts to close when the value of refrigerant pressure, at the selected location, falls below a lower value of refrigerant pressure than the preselected value of refrigerant pressure; and wherein the fluid passage of the flow-preventing means is connected in series with all the one or more refrigerant passages of said heat-exchanging means.

94. A heating system, in accordance with claim 39, wherein said heat-exchanging means also has a fluid inlet, a fluid outlet and one or more fluid passages conncting the fluid inlet of said heat-exchanging means to the fluid outlet of said heat-exchanging means; and wherein the heat sink is water which flows through and is heated in, including boiled in, the one or more fluid passages of said heat-exchanging means—whenever the pressure of the refrigerant, at the selected location, exceeds the preselected value of refrigerant pressure—by heat released by refrigerant flowing through the one or more refrigerant passages of said heat-exchanging means.

95. A heating system, in accordance with claim 94, wherein the water flowing through the one or more fluid passage of said heat-exchanging means is supplied by a pressurized supply of water, including a water mains supply; and wherein the heated, including boiled water, exiting the one or more fluid passages of said heat-rejecting means is dumped at a selected dumping location.

96. A heating system, in accordance with claim 90, wherein the substance is water; wherein said condensing means has a liquid inlet, a liquid outlet, and one or more fluid passages connecting the liquid inlet of said condensing means to the liquid outlet of said condensing means; and wherein water from a pressurized water supply, including a water mains supply, flows through the one or more fluid passages of said condensing means whenever the pressure of the refrigerant, at the selected location, exceeds the preselected value of refrigerant pressure; and wherein the heated, including boiled, water exiting the one or more liquid passages of said condensing means is dumped at a selected location.

97. A heating system, in accordance with claim 91, wherein said heat-rejecting means also includes a fluid (a) first heat-exchanging means having
  (1) a refrigerant inlet, a refrigerant outlet, and one or more refrigerant passages connecting the refrigerant inlet of said first heat-exchanging means to the refrigerant outlet of said first heat-exchanging means, and
  (2) a fluid inlet, a fluid outlet, and one or more fluid passages, in thermal contact with the one or more refrigerant passages of said first heat-exchanging means, connecting the fluid inlet of said first heat-exchanging means to the fluid outlet of said first heat-exchanging means;

(b) a second heat-exchanging means having
  (1) a fluid inlet connected to the fluid outlet of said first heat-exchanging means, and one or more fluid passages connecting the fluid inlet of said second heat-exchanging means to the fluid outlet of said second heat-exchanging means, and
  (2) one or more heat-conducting surfaces in thermal contact with the one or more fluid passages of said first heat-exchanging means, and with the outdoor ambient air; wherein the refrigerant inlet of said first heat-exchanging means is connected to the inlet of said heat-rejecting means, and the refrigerant outlet of said first heat-exchanging means is connected to the outlet of said heat-rejecting means; wherein the fluid absorbs heat from the refrigerant in said first heat-exchanging means, whenever the pressure of the refrigerant at the selected location exceeds the preselected value of refrigerant pressure, and releases the absorbed heat in said second heat-exchanging means; and wherein the released heat is rejected by said second heat-exchanging means to the outdoor ambient air.

98. A heating system, in accordance with claim 90, wherein the fluid is a refrigerant which absorbs heat, at least in part by evaporation, in said first heat-exchanging means, and released the absorbed heat, at least in part by condensation, in said second heat-exchanging means.

99. A heating system, in accordance with claim 40, wherein the flow-preventing means has a refrigerant passage and is controlled by refrigerant temperature so that the flow-preventing means, with increasing refrigerant temperature, starts to open when the value of refrigerant temperature, at the selected location, rises above the preselected value of refrigerant temperature, and so that the flow-preventing means, with decreasing refrigerant temperature, starts to close when the value of refrigerant temperature, at the selected location, falls below a refrigerant temperature having a value between the preselected refrigerant temperature and the value of the refrigerant temperature at which said flow-preventing means stops opening.

100. A heating system, in accordance with claim 92, wherein the flow-prevennting means has a refrigerant passage and is controlled by refrigerant pressure so that the flow-preventing means, with increasing refrigerant pressure, starts to open when the value of refrigerant pressure, at the selected location, rises above the preselected value of refrigerant pressure, and so that the flow-preventing means, with decreasing refrigerant pressure, starts to close when the value of refrigerant pressure, at the selected location, falls below a refrigerant pressure having a value between the preselected refrigerant pressure and the value of the refrigerant pressure at which said flow-preventing means stops opening.

101. A heating system, in accordance with claim 40, wherein the improvement also comprises means for stopping the flow the refrigerant into the refrigerant passages of said heat-exchanging means whenever the temperature of the refrigerant at the selected location is less than the preselected value of refrigerant temperature, and the temperature of the refrigerant in the refrigerant passages of said heat-exchanging means is less than the temperature of the refrigerant in the refrigerant passages of said condensing means; thereby also reducing loss of heat from the refrigerant to the heat sink whenever the temperature of the refrigerant is higher than the temperature of the heat sink.

102. A heating system, in accordance with claim 101, wherein said flow-stopping means includes:
(a) a two-way fluid valve, having an inlet connected to the branch point and an outlet connected to the refrigerant inlet of said heat-exchanging means.
(b) means for maintaining the two-way fluid valve closed whenever the temperature of the refrigerant at the selected location is less than the preselected value of refrigerant temperature, and
(c) a one-way fluid valve, having an inlet connected to the refrigerant outlet of said heat-exchanging means and an outlet connectd to the first mergence point.

103. A heating system, in accordance with claim 92, wherein the flow-preventing means has a refrigerant passage and is controlled by refrigerant pressure so that the flow-preventing means, with increasing refrigerant pressure, starts to open when the value of refrigerant pressure, at the selected location, rises above the preselected value of refrigerant pressure, and so that the flow-preventing means, with decreasing refrigerant pressure, starts to close when the value of refrigerant pressure, at the selected location, falls below a refrigerant pressure having a value between the preselected refrigerant pressure and the value of the refrigerant pressure at which said flow-preventing means stops opening.

104. A heating system, in accordance with claim 103, wherein said flow-stopping means includes:
(a) a two-way fluid valve, having an inlet connected to the branch point and an outlet connected to the refrigerant inlet of said heat-exchanging means,
(b) means for maintaining the two-way fluid valve closed whenever the pressure of the refrigerant at the selected location is less than the preselected value of refrigerant pressure, and
(c) a one-way fluid valve, having an inlet connected to the refrigerant outlet of said heat-exchanging means and an outlet connected to the first mergence point.

105. An improved method for collecting radiant energy emanating from the sun, for absorbing heat from the collected radiant energy, and for transferring the absorbed heat to a substance, wherein
(a) a refrigerant is circulated in one or more refrigerant circuits—located in the earth's gravitational field—which include
(1) means for absorbing the radiant heat, said absorbing means having one or more refrigerant passageways, and
(2) means for releasing the absorbed heat and for transferring the released heat to the substance, said releasing and transferring means having one or more refrigerant passages and one or more condensing surfaces;
(b) heat is absorbed from the radiant energy in said absorbing means at least in part by evaporating liquid refrigerant entering said absorbing means;
(c) the absorbed heat is released in said releasing and transferring means by condensing substantially all the evaporated refrigerant; and
(d) the refrigerant is circulated in the one or more refrigerant circuits solely by the action of the absorbed heat and the earth's gravitational field;
wherein the improvement comprises:
(a) preventing, at a preselected evaporation temperature, liquid refrigerant—displaced from the refrigerant passageways of said absorbing means at the highest evaporation rate achievable at the preselected evaporation temperature—backing-up into the one or more refrigerant passages of said releasing and transferring means and flooding a substantial portion of the one or more condensing surfaces, by storing the displaced liquid refrigerant in a space having a highest point at or below the level of a lowest point of the one or more condensing surfaces;
(b) preventing, at the preselected evaporation temperature, refrigerant vapor exiting said absorbing means from being superheated at a preselected minimum evaporation rate, which may be chosen arbitrarily small, by charging the one or more refrigerant circuits with a large enough mass of refrigerant; and
(c) preventing, at the preselected evaporation temperature, refrigerant vapor exiting said absorbing means from being superheated, at the highest achievable evaporation rate at the preselected evaporation temperature, by
(1) locating said releasing and transferring means high enough above the level of the liquid refrigerant surfaces, in the one or more refrigerant circuits, when no heat is being absorbed by the refrigerant from the radiant energy and when the liquid refrigerant surfaces are at a temperature equal to the preselected evaporation temperature, and by <(2) selecting the cross-sectional areas of the refrigerant passages of the one or more refrigerant circuits—including the one or more refrigerant passageways of said absorbing means and the one or more refrigerant passages of said condensing means—so that—at the preselected evaporation temperature and maximum achievable evaporation rate at the preselected evaporation temperature—in the one or more refrigerant circuits, including the one or more refrigerant passageways of said absorbing means,
   (1) the net static head is high enough, and
   (2) the friction-induced pressure drop is low enough, for the product of the refrigerant latent heat of evaporation and the total refrigerant mass flow rate in the one or more refrigerant passageways of said absorbing means, at the preselected evaporation temperature, to be no less than the highest achievable refrigerant heat-absorption rate at the preselected evaporation temperature;
thereby also preventing, at the preselected evaporation temperature,
   (a) liquid refrigerant backing-up into the one or more refrigerant passages of said releasing and transferring means and flooding a substantial portion of the one or more condensing surfaces at all evaporation rates between the preselected minimum evaporation rate and the maximum achievable evaporation rate at the preselected evaporation temperature; and
   (b) refrigerant vapor exiting said absorbing means from being super-heated at all evaporation rates between the preselected minimum evaporation rate and the maximum achievable evaporation rate at the preselected evaporation temperature.

106. An improved method for collecting radiant energy emanating from the sun, for absorbing heat from the collected radiant energy, and for transferring the absorbed heat to a substance, wherein
   (a) a refrigerant is circulated in one or more refrigerant circuits—located in the earth's gravitational field—which include
      (1) means for absorbing the radiant heat, said absorbing means having one or more refrigerant passageways, and
      (2) means for releasing the absorbed heat and for transferring the released heat to the substance, said releasing and transferring means having one or more refrigerant passages and one or more condensing surfaces;
   (b) heat is absorbed from the radiant energy in said absorbing means at least in part by evaporating liquid refrigerant entering said absorbing means;
   (c) the absorbed heat is released in said releasing and transferring means by condensing substantially all the evaporated refrigerant; and
   (d) the refrigerant is circulated in the one or more refrigerant circuits solely by the action of the absorbed heat and the earth's gravitational field;
wherein the improvement comprises:
   (a) preventing, at a lowest preselected evaporation temperature, liquid refrigerant—displaced from the refrigerant passageways of said absorbing means, at the highest evaporation rate achievable at the lowest preselected evaporation temperature—backing-up into the one or more refrigerant passages of said releasing and transferring means and flooding a substantial portion of the one or more condensing surfaces, by storing the displaced liquid refrigerant in a space having a highest point at or below the level of a lowest point of the one or more condensing surfaces;
   (b) preventing, at a highest preselected evaporation temperature, refrigerant vapor exiting said absorbing means from being superheated at a preselected minimum evaporation rate, which may be chosen arbitrarily small, by charging the one or more refrigerant circuits with a large enough mass of refrigerant; and
   (c) preventing at the lowest preselected evaporation temperature, refrigerant vapor exiting said absorbing means from being superheated, at the highest achievable evaporation rate at the lowest preselected evaporation temperature, by
      (1) locating said releasing and transferring means high enough above the level of the liquid refrigerant surfaces, in the one or more refrigerant circuits, when no heat is being absorbed by the refrigerant from the radiant energy and when the liquid refrigerant surfaces are at a temperature equal to the lowest preselected evaporation temperature, and by
      (2) selecting the cross-sectional areas of the refrigerant passages of the one or more refrigerant circuits—including the one or more refrigerant passageways of said absorbing means and the one or more refrigerant passages of said condensing means—so that—at the lowest preselected evaporation temperature and the maximum achievable evaporation rate at the lowest preselected evaporation temperature—in the one or more refrigerant circuits, including the one or more refrigerant passageways of said absorbing means,
         (1) the net static head is high enough, and
         (2) the friction-induced pressure drop is low enough, for the product of the refrigerant latent heat of evaporation and the total refrigerant mass flow rate in the one or more refrigerant passageways of said absorbing means, at the lowest preselected evaporation temperature, to be no less than the highest achievable refrigerant heat-absorption rate at the lowest preselected evaporation temperature;
thereby also preventing, at all evaporation temperatures in the range between the lowest preselected evaporation temperature and the highest preselected evaporation temperature,
   (a) liquid refrigerant backing-up into the one or more refrigerant passages of said releasing and transferring means and flooding a substantial portion of the one or more condensing surfaces at all evaporation rates between the preselected minimum evaporation rate and the maximum achievable evaporation rate at all evaporation temperatures in said range; and
   (b) refrigerant vapor exiting said absorbing means from being superheated at all evaporation rates between the preselected minimum evaporation rate and the maximum achievable evaporation rate at all evaporation temperatures in said range.

107. A heating system, in accordance with claim 105, wherein the improvement also comprises separating—at the preselected evaporation temperature and at all evaporation rates between the preselected minimum evaporation rate and the maximum achievable evaporation rate—the evaporated portion from the non-evaporated portion of the refrigerant exiting said absorbing means, transferring the evaporated portion of the refrigerant to said condensing means, and returning the non-evaporated portion of the refrigerant to said absorbing means; thereby ensuring that dry refrigerant vapor is delivered to said condensing means at the preselected evaporation temperature, and at all evaporation rates between the minimum preselected evaporation rate and the maximum achievable evaporation rate.

108. A heating system, in accordance with claim 106, wherein the improvement also comprises separating—at all evaporation temperatures in said range and at all evaporation rates between the preselected minimum evaporation rate and the maximum achievable evaporation rate—the evaporated portion from the non-evaporation portion of the refrigerant exiting said absorbing means, transferring the evaporated portion of the refrigerant to said condensing means, and returning the non-evaporated portion of the refrigerant to said absorbing means; thereby ensuring that dry refrigerant vapor is delivered to said condensing means at all evaporation temperatures in said range, and at all evaporation rates between the minimum preselected evaporation rate and the maximum achievable evaporation rate.

109. A heating system, in accordance with claim 24, wherein said means for varying the effective volumetric capacity of the refrigerant pump includes a differential pressure transducer for determining the height of said liquid level above a preselected reference height by effectively weighing the column of liquid refrigerant between said liquid level and said reference height.

110. An improved heating system, located in the gravitational field of the earth, for collecting radiant energy emanating from a source of radiant energy, for absorbing heat from the collected radiant energy, and for transferring the absorbed heat to a substance, of the type having a refrigerant and a principal refrigerant circuit—within which the refrigerant is circulated, while the system is operating, by the net static head (in the principal refrigerant circuit) resulting solely from the action of the absorbed heat and the earth's gravitational field—which includes:

(a) means for absorbing heat from the radiant energy and for evaporating at least a portion of the liquid refrigerant entering said absorbing means, said absorbing means having one or more inlets, one or more outlets, and one or more refrigerant passageways connecting the one or more inlets of said absorbing means to the one or more outlets of said absorbing means;

(b) means for condensing essentially all the evaporated portion of the refrigerant exiting said absorbing means and transferring heat from the refrigerant to the substance, said condensing means having one or more condensing surfaces, a refrigerant inlet, a refrigerant outlet, and one or more refrigerant passages connecting the refrigerant inlet of said condensing means to the refrigerant outlet of said condensing means;

(c) means for transferring refrigerant vapor from said absorbing means to said condensing means; and (d) means for returning liquid refrigerant from said condensing means to said absorbing means;

wherein the improvement comprises a plurality of means employed to ensure—by the combined action of said means—that, for all external conditions under which the system is designed to operate, at least the four system internal operating conditions cited below are satisfied:

first, liquid refrigerant entering said absorbing means has a mass flow rate large enough to prevent the amount of superheat of the evaporated portion of the refrigerant exiting said absorbing means exceeding any desired preselected value, including a zero value;

second, the refrigerant vapor entering said condensing means is maintained in a substantially dry state;

third, the amount of liquid refrigerant which backs up into the one or more refrigerant passages of said condensing means and floods—or put equivalently immerses—the one or more condensing surfaces of said condensing means is small enough to prevent the absolute value of the difference between the effective condensing surface area and the total available surface area of the one or more condensing surfaces exceeding any desired preselected value, including a zero value; and fourth, the absolute value of the difference between the saturated vapor temperature exiting said absorbing means and the saturated vapor temperature entering said condensing means is maintained below any desired value, including an arbitrarily small value, but not a zero value;

thereby ensuring that the full potential of the latent-heat properties of the refrigerant is exploited within the limits imposed by said preselected value for the amount of superheat and said preselected value for the difference between the effective condensing area and the available condensing area of said condensing surfaces.

111. A heating system, in accordance with claim 110, wherein the improvement also comprises means for preventing liquid refrigerant entering said absorbing means while said absorbing means is stagnating at temperatures above the maximum design operating temperature of the system; thereby preventing the refrigerant pressure exceeding the refrigerant saturation pressure corresponding to the temperature of the substance.

112. A heating system, in accordance with claim 110, wherein the improvement also comprises means for rejecting heat from the refrigerant whenever the collector is stagnating at temperatures above the maximum design operating temperature of the system; thereby preventing both the refrigerant temperature exceeding the temperature at which the heat rejection rate equals the heat-absorption rate from the radiant energy, and the refrigerant pressure exceeding the refrigerant saturation pressure corresponding to the refrigerant temperature at which said heat-absorption and said heat-rejection rates are equal.

* * * * *